United States Patent
Yamamoto et al.

(10) Patent No.: US 9,778,762 B2
(45) Date of Patent: Oct. 3, 2017

(54) INFORMATION PROCESSOR HAVING AN INPUT UNIT WHICH INPUTS INFORMATION ON AN INPUT MEDIUM

(71) Applicant: FUJIFILM Corporation, Tokyo (JP)

(72) Inventors: Akira Yamamoto, Kanagawa (JP); Yoji Ito, Kanagawa (JP); Michio Nagai, Kanagawa (JP); Daisuke Kashiwagi, Kanagawa (JP); Nobuhiko Ichihara, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/927,876

(22) Filed: Oct. 30, 2015

(65) Prior Publication Data

US 2016/0124529 A1    May 5, 2016

(30) Foreign Application Priority Data

Oct. 31, 2014  (JP) ................................ 2014-223349

(51) Int. Cl.
   *G06F 3/033*   (2013.01)
   *G06F 3/0354*   (2013.01)
   (Continued)

(52) U.S. Cl.
   CPC ........ *G06F 3/03545* (2013.01); *G06F 3/0321* (2013.01); *G06K 9/2063* (2013.01);
   (Continued)

(58) Field of Classification Search
   CPC .. G06F 3/03545; G06F 3/0321; G06F 3/0325; G06F 3/0317; G06K 19/06037; G06K 9/22; G06K 9/3216; G06K 9/2063
   (Continued)

(56) References Cited

U.S. PATENT DOCUMENTS 5,248,856 A * 9/1993 Mallicoat ............. G06F 3/0423
                                                    178/18.09
8,523,237 B2   9/2013 Sekine et al.
(Continued)

FOREIGN PATENT DOCUMENTS

JP            4973248 B2    7/2012
JP         2014-67398 A     4/2014
WO   WO 2016022097 A1 *    2/2016   ........... G06F 3/0304

*Primary Examiner* — Rodney Amadiz
(74) *Attorney, Agent, or Firm* — Edwards Neils LLC; Jean C. Edwards, Esq.

(57) ABSTRACT

The information processor includes an input unit having an illuminating part and an image pickup part, and an input medium having an input surface on which inputting of information is carried out by the input unit which has position coordinates on the input surface coded by a dot pattern. The input unit irradiates light from the illuminating part onto input surface of the input medium. The irradiated light reflects off the dot contained in the dot pattern which is picked up by the image pickup part, and position information of the dot pattern is obtained. The input unit further has an input unit angular position measuring part that measures an angular position of the input unit when the light is irradiated. Based on corrected position information obtained by correction processing based on the angular position, input information, that is specified by the position coordinates is obtained.

20 Claims, 6 Drawing Sheets

(51) Int. Cl.
*G06F 3/03* (2006.01)
*G06K 9/22* (2006.01)
*G06K 19/06* (2006.01)
*G06K 9/20* (2006.01)
*G06K 9/32* (2006.01)

(52) U.S. Cl.
CPC ............... *G06K 9/22* (2013.01); *G06K 9/222* (2013.01); *G06K 9/3216* (2013.01); *G06K 19/06037* (2013.01)

(58) Field of Classification Search
USPC ............... 345/179, 180, 182, 183; 178/19.05
See application file for complete search history.

(56) References Cited

U.S. PATENT DOCUMENTS

| | | | |
|---|---|---|---|
| 2003/0112220 A1* | 6/2003 | Yang | G06F 3/03545 345/156 |
| 2008/0252064 A1 | 10/2008 | Sekine et al. | |
| 2012/0249482 A1* | 10/2012 | Kiyose | G06F 3/0304 345/175 |
| 2012/0263381 A1* | 10/2012 | Yoshida | G06F 3/03545 382/189 |
| 2014/0062964 A1 | 3/2014 | Nagaoka | |
| 2017/0123512 A1* | 5/2017 | Gore | G06F 3/0317 |

* cited by examiner (A)

(B)

(A)  (B)  (C)

INFORMATION PROCESSOR HAVING AN INPUT UNIT WHICH INPUTS INFORMATION ON AN INPUT MEDIUM

CROSS-REFERENCE TO RELATED APPLICATIONS

This application claims priority under 35 U.S.C 119 to Japanese Patent Application No. 2014-223349 filed on Oct. 31, 2014. The above application is hereby expressly incorporated by reference, in its entirety.

BACKGROUND OF THE INVENTION

Field of the Invention

The present invention relates to an information processor and to a method of inputting information to this information processor.

Discussion of the Background

In recent years, information processors have been proposed where an input unit such as an electronic pen is displaced on an input surface having a dot pattern and the displacement path is obtained as electronic information based on the position coordinates of each position on the input surface (for example, see Patent References 1 and 2).

Patent Reference 1: Japanese Patent No. 4,973,248
Patent Reference 2: JP-A-No. 2014-67398

SUMMARY OF THE INVENTION

With the information processors proposed in Patent References 1 and 2 above and the like, for example, a handwritten text or image can be obtained as electronic information that can be processed and stored electronically by a computer. To make this possible, the position coordinates of various positions on an input surface are coded by a dot pattern (coding by a dot pattern). More specifically, each position on the input surface is coded so that each of the position coordinates is specified by a dot pattern comprised by some combination of multiple dots.

For example, Patent Reference 1 discloses (for example, see paragraph 0009 in Patent Reference 1) obtaining the position information of an input unit by forming a dot pattern for coding position coordinates out of a nonvisible light reflecting material and reading the reflection pattern of the nonvisible light to specify the displacement path of the input unit (described as an input terminal in Patent Reference 1). Additionally, Patent Reference 2 discloses detecting a dot pattern by absorbing, in dots, infrared light that is emitted by an input unit (described as an electronic pen in Patent Reference 2) and reflecting the infrared light in areas outside the dots (for example, see paragraphs 0031 to 0037 in Patent Reference 2).

In the above information processors, electronic information in the form of the displacement path of an input unit can be obtained by specifying the position on an input surface on which the input unit has passed when being displaced based on position coordinates specified based on a dot pattern that is detected by the reflection of light or the like. Normally, the input unit is equipped with an illuminating part and an image pickup part. The illuminating part irradiates light toward the dot pattern and the image pickup part uses the reflected light or the like obtained by light reflecting off dots to detect a dot pattern.

However, based on investigation, the present inventors found that in the above information processors, there were cases where reading errors ended up occurring without being able to specify the position coordinates of the positions on which the input unit had passed on the input surface. Such reading errors may cause partial loss, distortion, and the like in text and images obtained as electronic information. Thus, reproducibility ended up dropping in the course of reproducing the text and images drawn by the input unit as electronic information.

With the above information processor, it becomes possible not only to obtain the displacement path of the input unit as electronic information, but also to specify the position of virtual buttons indicated (selected) by means of the input unit in an input medium (such as an information processing terminal in the form of a tablet terminal or the like) having virtual buttons for the selection of one or more among multiple selection options. However, when a reading error ends up occurring such that the position indicated by the input unit cannot be specified, it becomes impossible to identify and specify the virtual button that has been selected by means of the input unit.

Accordingly, in information processors utilizing coding by dot patterns, there is a need to enhance the precision with which position coordinates are specified.

Thus, an aspect of the present invention provides for means for enhancing the precision with which position coordinates are specified in an information processor that specifies position coordinates utilizing coding by dot patterns.

An aspect of the present invention relates to an information processor,
which comprises:
an input unit having an illuminating part and an image pickup part and
an input medium having an input surface on which inputting of information is carried out by the input unit;
wherein, on the input medium, position coordinates on the input surface are coded by a dot pattern present on the input medium,
the dot pattern contains one or more dots exhibiting retroreflectivity for light entering from a direction oblique to the dot,
the input unit irradiates light from the illuminating part onto the input medium on the input surface of the input medium, the irradiated light reflects off the dot contained in the dot pattern, the reflected light is picked up by the image pickup part, and position information of the dot pattern containing the dot that has reflected light is obtained,
the input unit further has an input unit angular position measuring part that measures an angular position of the input unit during the light is irradiated, and
based on correction processed position information obtained by correction processing based on the angular position measured by the input unit angular position measuring part in the position information obtained, input information specified by the position coordinates of a position on the input surface on which the light is irradiated is obtained.

In the present invention and in the present specification, the term "dot" refers to a protruding portion having a shape in the form of a partially cut away sphere (partial spherical shape) or a shape in the form of a partially cut away spheroid (partial spheroidal shape). The dot appears as a circle when observed in a vertical direction. The center of the circle thus observed will be referred to as the dot center. The position of the dot center will be considered to be the dot center position in the present specification and in the present invention. The "dot diameter" refers to the diameter of the circle thus observed. The shape of the circle observed can be a perfect circle or can be an approximate circle such as an ellipse. Taking the position of maximum height in the vertical direction from the surface on which the dots are disposed (called the "apex" hereinafter) as 0°, taking the horizontal direction of the surface on which the dots are disposed as 90°, light entering toward the dot from a direction of greater than 0° but not greater than 50° will be referred to as "light entering from a direction oblique to the dot".

Light reflection can be roughly divided into the three types of mirror surface reflection (positive reflection) where the incidence angle and reflection angle are equal, diffuse reflection (scattered reflection) where the light reflects in various directions, and retroreflectivity, where the reflecting light exits in the direction of incidence. An actual reflecting body will normally not just have complete mirror surface reflection, complete diffuse reflection, or complete retroreflectivity, but rather a reflectance distribution combining two or more of these properties. In the present specification and in the present invention, the term "retroreflectivity" refers to light reflecting back and exiting in the direction of incidence of the light, but mirror surface reflection can also be present. The term "direction of incidence of the light" means the precise angle or direction or with an error of less than ±10° from the precise angle or direction. The error from the precise angle or direction is desirably less than 5°, and preferably less than 3°. The dots constituting the dot pattern in the input medium desirably exhibit retroreflectivity at the dot apex, as well.

The presumptions of the present inventors that are given below are not intended to limit the present invention in any way. For example, dots employing a liquid crystal material having a cholesteric structure such as are described in Patent Reference 1 will normally exhibit retroreflectivity at the dot apex, but will not exhibit retroreflectivity for light entering from a direction oblique to the dot. Thus, with the dot pattern that is described in Patent Reference 1, when the input unit is tilted obliquely for use, strong reflected light cannot be achieved. As a result, coding by the dot pattern is precluded and a reading error ends up being generated. The present inventors presume the specific reason for this to be as follows.

Since a liquid crystal material having a cholesteric structure has the property of reflecting light most powerfully in the direction of the cholesteric helical axis (also referred to simply as the "helical axis" hereinafter), it can exhibit retroreflectivity for light entering in the direction of the helical axis. Additionally, the helical axis of a cholesteric structure will normally be aligned perpendicularly to the surface on which the cholesteric structure is disposed. For dots employing a liquid crystal material having a cholesteric structure, light perpendicularly entering the dot apex will retroreflect because it is entering in the direction of the helical axis. However, light entering from an oblique direction will not retroreflect because it is entering from a different direction than the direction of the helical axis, and is thought to diffusely reflect. Due to this diffuse reflection, the reflected light received by the input unit will be much weaker than the retroreflected light. Thus, it is normally impossible for the image pickup part of the input unit to generate an image and obtain reflected light of an intensity permitting detection of the dots. This is presumed to be why a reading error ends up being generated when employing an input unit that is tilted obliquely with dots utilizing a liquid crystal material having a cholesteric structure such as are described in Patent Reference 1.

By contrast, when the dots constituting the dot pattern are dots exhibiting retroreflectivity for light entering in a direction oblique to the dot, since retroreflected light can be obtained even when the input unit is obliquely tilted for use, it becomes possible for the image pickup part to generate an image and detect the dots.

However, investigation by the present inventors revealed that reading errors sometimes still ended up being generated even in an information processor utilizing dots that exhibited retroreflectivity for light entering in directions oblique to the dots such as set forth above. The present inventors conducted intensive research to determine why. As a result, they presumed the reason to be the following phenomenon unique to dots exhibiting retroreflectivity of light entering in an oblique direction.

In an information processor utilizing coding by dot patterns, the individual dots constituting a dot pattern are normally correlated to prescribed values based on the positions at which they are present on the input surface. For example, prescribed values (such as the numbers 0, 1, 2, 3) are correlated with individual dots by shifting the positions of the dots up, down, left, or right from a reference position (point of intersection of a vertical axis and horizontal axis forming a grid) on a virtual grid. Each position on the grid can be converted to a first bit value X coordinate and a second bit value Y coordinate. The dot pattern position information is comprised by combining the information thus correlated. Here, the position of each dot is specified as the dot center position, that is, the position of the center of the circle when observed vertically. The dot position coordinates (the position coordinates of a dot are not position coordinates specifying the individual position on the input surface, but rather position coordinates specifying the position at which the dot is disposed in order to identify individual dots) are normally specified by two-dimensional coordinates in the X direction and Y direction (horizontal axis and vertical axis). In the image that is generated by the image pickup part of the input unit, detected dots are identified based on the position coordinates of the brightest high point (center of brightness). More specifically, dots that are detected as an image by the image pickup part are identified as being dots that are disposed at the position coordinates of centers of brightness.

However, the above presumes that retroreflected light can be obtained from the dot apex using the input unit without tilting it. That is, there is a presumption that the dot centers and the brightness centers can be matched up.

When the input unit is used while tilted, the light that is irradiated by the illuminating part of the input unit enters obliquely with respect to the dots and retroreflects. However, in the retroreflected light thus obtained, the brightness is greatest at positions where the light entering the dot surface enters at an incidence angle that is perpendicular or nearly perpendicular. Accordingly, the brightness centers in the image generated by the image pickup part of the input unit do not match up with the dot centers (apexes). That is, there is a misalignment of the brightness center and the dot center. As a result, when a determination ends up being made that no dot having position coordinates that match those of the detected dot exists, a phenomenon whereby the dot cannot be identified ends up occurring. The present inventors presume that the reading error in information processors utilizing dots exhibiting retroreflectivity for light entering from directions oblique to the dots is produced by this phenomenon.

Accordingly, the present inventors conducted further extensive research. As a result, they corrected the misalignment of the positions of the brightness center and the dot center based on the angular position of the input unit when light was being irradiated by the illuminating part of the input unit on the input surface of the input medium. They discovered that this correction processing made it possible to identify dots even when the input unit was employed with a tilt. An information processor according to an aspect of the present invention was devised. The input unit of the information processor was equipped with an input unit angular position measuring part to effect this correction. In the present specification and in the present invention, the term "angular position" refers to a position that is specified by the angle relative to a reference surface or reference direction. Details regarding the input unit angular position measuring part and the correction processing will be given further below.

The above contains presumptions made by the present inventors and is not intended to limit the present invention in any way.

In one embodiment, the input unit is displaced on the input surface of the input medium while irradiating light onto the medium from the illuminating part. Based on correction processed position information, the input unit obtains input information in the form of the displacement path of displacement of the input unit on the input surface of the input medium.

In one embodiment, the dot is a cholesteric liquid crystal dot. The term "cholesteric liquid crystal dot" refers to a dot of a liquid crystal material having a cholesteric structure.

In one embodiment, the information processor comprises an input medium angular position measuring part that measures the angular position of the input medium. Based on the angular position of the input medium during light irradiation that is measured by the input medium angular position measuring part, the angular position of the input medium measured by the input medium angular position measuring part is corrected. Based on the corrected angular position, correction processed position information is obtained.

In one embodiment, the input medium has one or more additional layers provided on the dot pattern. Correction processing is conducted based on the refractive index and thickness of the additional layers and correction processed position information is obtained.

In one embodiment, the light that is irradiated by the illuminating part of the input unit is near infrared light. In the present invention and in the present spcification, the term "near infrared light" refers to electromagnetic waves within the wavelength range of 780 to 2,500 nm.

In one embodiment, the input unit is in the form of a pen.

In one embodiment, the input unit is a handwriting input pen.

In one embodiment, the input unit further comprises an information transmitting part that transmits the input information that is obtained to an information displaying part that displays the information.

A further aspect of the present invention relates to a method of inputting information to the above information processor, comprising irradiating light from the illuminating part onto the input medium on the input surface of the medium with the input unit in a tilted state relative to the input medium.

In one embodiment, the above method of inputting information comprises displacing the input unit while irirradiating light from the illuminating part onto the input medium on the input surface of the medium with the input unit in a tilted state relative to the input medium. In one embodiment, the information that is inputted in this manner is at least one selected from the group consisting of text information and image information.

An aspect of the present invention can provide an information processor utilizing coding by dot patterns that makes it possible to specify position coordinates with high precision even when using the input unit with a tilt relative to the input medium.

DETAILED DESCRIPTION OF THE EMBODIMENTS

Figure 1:
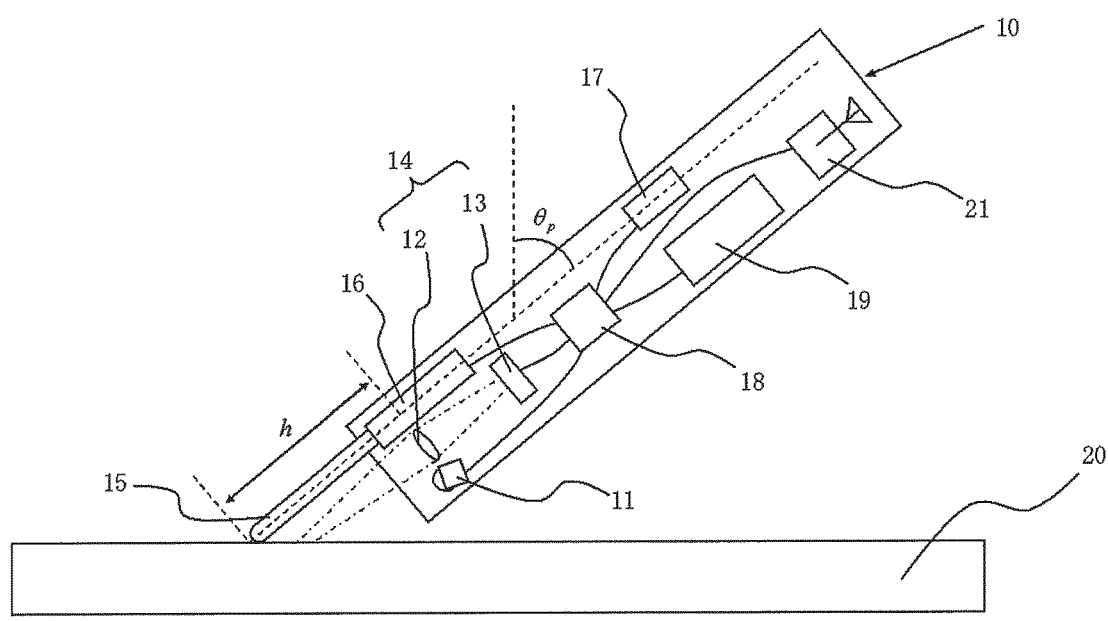
FIG. 1 is a descriptive drawing showing the schematic structure of a handwriting input pen in an embodiment of the input unit.

The present invention is described below based on representative implementation modes. However, the present invention is not limited to such implementation modes. In the present specification and in the present invention, a numeric range denoted using the word "to" signifies a range including the preceding and succeeding numeric values as minimum and maximum values, respectively. Further, in the present specification and in the present invention, description relating to angles such as "vertical" and description relating to directions include the range of error that is accepted in the field of art to which the present invention belongs. For example, it means within a range of less than ±10° from the precise angle or direction. The error with the precise angle or direction is desirably less than or equal to 5°, preferably less than or equal to 3°.

[Information Processor]

An aspect of the present invention relates to an information processor, which comprises:

an input unit having an illuminating part and an image pickup part and an input medium having an input surface on which inputting of information is carried out by the input unit;

wherein, on the input medium, position coordinates on the input surface are coded by a dot pattern present on the input medium, the dot pattern contains one or more dots exhibiting retroreflectivity for light entering from a direction oblique to the dot, the input unit irradiates light from the illuminating part onto the input medium on the input surface of the input medium, the irradiated light reflects off the dot contained in the dot pattern, the reflected light is picked up by the image pickup part, and position information of the dot pattern containing the dot that has reflected light is obtained, the input unit further has an input unit angular position measuring part that measures an angular position of the input unit during the light is irradiated, and based on correction processed position information obtained by correction processing based on the angular position measured by the input unit angular position measuring part in the position information obtained, input information specified by the position coordinates of a position on the input surface on which the light is irradiated is obtained.

The above information processor will be described in greater detail below.

<Input Medium>

The information processor is capable of inputting various information. For example, in one embodiment, the displacement path of displacement of the tip portion of the input unit on the input surface of the input medium can be obtained in the form of input information selected from the group consisting of text information and image information. In this manner, for example, it becomes possible to convert information inputted by handwriting to electronic information. In another embodiment, as set forth above, a virtual button selected by the input unit can be specified.

Since information processing is possible in the manner set forth above, the input medium has dot patterns. The dot patterns include dot patterns constituted by some combination of multiple dots. A summary of the coding of such dot patterns has been set forth above. Specific forms will be given below. When light is irradiated by the illuminating part of the input unit onto the input surface of the input medium on which such a dot pattern is present, the position on the input surface selected by the input unit can be specified based on the position information of the dot pattern that has reflected the light that has been irradiated. Thus, for example, a text or image that has been drawn in the form of the displacement path of the tip portion of the input medium can be obtained as electronic information. Further, the specification of virtual button as set forth above also becomes possible. The information processors and systems that utilize such dot patterns are known. For example, reference can be made to known art such as Japanese Patent Nos. 4,658,427, 4,138,658, and 4,973,248; and JP-A-Nos. 2014-67398 and 2012-230603.

In an information processor according to an aspect of the present invention, the dot pattern contains dots exhibiting retroreflectivity for light entering in a direction oblique to the dots. As stated above, the present inventors presume that this relates to the fact that it is possible to identify the dots and enhance the specification precision of position coordinates even in cases when the input unit is used with a tilt. It is optimal for all of the dots contained in the dot pattern to exhibit retroreflectivity for light entering in a direction oblique to the dots. However, the range of error that is accepted in the field of art to which the invention belongs—for example, embodiments in which fewer than or equal to 5% of the dots, based on the number of dots, do not have the above retroreflectivity—is included in one embodiment of the present invention. Neither the dot size (dot diameter), spacing between dots (distance between dots on center), nor the number of dots disposed on the input surface is specifically limited. These can be set based on the application of the information processor.

The material employed to form the dots can be any organic material or inorganic material, without limitation, so long as it permits the formation of dots exhibiting retroreflectivity for light entering in a direction oblique to the dots. A combination of an inorganic material and an organic material can also be used to form the dots. One example is the retroreflective material described in JP-A-No. 2008-268585, paragraphs 0010 to 0013.

From the perspective of further enhancing precision in specifying position coordinates, the dots desirably have wavelength-selective reflectivity. In the present invention and in the present specification, the term "wavelength-selective reflectivity" refers to the property of strongly reflecting light in a specific wavelength band. The dots exhibiting wavelength-specific reflectivity and retroreflectivity are desirably cholesteric liquid crystal dots.

(Cholesteric Liquid Crystal Dot)

Cholesteric liquid crystal dots will be described in greater detail below.

The wavelength-selective reflectivity of cholesteric liquid crystal dots is imparted by their cholesteric structure. The center wavelength $\lambda$ of the wavelengths exhibiting wavelength-selective selectivity (the selective reflectivity wavelengths) depends on the pitch P (=helical pitch) of the helical structure in the cholesteric structure, and follows a relation with the average refractive index n of the cholesteric liquid crystal, with $\lambda = n \times P$. Thus, adjusting the pitch of the helical structure permits adjusting the selective reflectivity wavelength. The pitch of the cholesteric structure normally depends on the type or concentration of added chiral agents, described further below. It is possible to achieve a desired pitch by adjusting them. A detailed description is given on pp. 60 to 63 of Fujifilm Research Report No. 50 (2005). The helical twist direction and pitch can be measured by the methods described in *An Introduction to Experiments in Liquid Crystal Chemistry*, compiled by the Japan Liquid Crystal Association, Sigma Publications, published in 2007, p. 46, and the Liquid Crystal Handbook, Liquid Crystal Handbook Compilation Committee, Maruzen, p. 196.

The cholesteric liquid crystal dots create a fringe pattern of bright and dark portions in the sectional SEM image of dots obtained by a scanning electron microscope (SEM). The repeating double portions of bright and dark portions (two bright portions and two dark portions) correspond to a single portion of the helical pitch. Accordingly, the pitch can be measured from the sectional SEM image. The direction normal to the various lines of the fringe pattern becomes the helical axis direction. The term "sectional" refers to the cross section in a direction perpendicular to the surface on which the dots are disposed and includes the dot apexes.

The full width at half maximum $\Delta\lambda$ ($nm$) of the wavelength band (selective reflection band) exhibiting wavelength-selective reflectivity depends on the pitch P and birefringence $\Delta n$ of the liquid crystal compound, and follows the relation $\Delta\lambda = \Delta n \times P$. Thus, the width of the selective reflection band can be controlled by adjusting $\Delta n$. $\Delta n$ can be adjusted by adjusting the types of polymerizable liquid crystal compounds, described further below, and their blending ratio, as well as by controlling the temperature during orientation and fixation. The full width at half maximum of the reflective wavelength band at which the cholesteric liquid crystal dots exhibit wavelength-specific reflectivity is, for example, 50 to 500 nm, desirably 100 to 300 nm.

The cholesteric structure of the liquid crystal material can be obtained by fixing the cholesteric liquid crystal phase. A structure in which the cholesteric liquid crystal phase has been fixed need only be a structure in which the orientation of the liquid crystal compound constituting the cholesteric liquid crystal phase maintains its orientation. Typically, it suffices to render a polymerizable liquid crystal compound in an orientation state of cholesteric liquid crystal phase and irradiate it with ultraviolet radiation, heat it, or the like to polymerize and cure it, thereby forming a layer with no fluidity in the form of a structure that is changed so that it does not undergo change in its state of orientation when subjected to an external field or external force. A structure in which the cholesteric liquid crystal phase is fixed such that the optical properties of the cholesteric liquid crystal phase are retained is adequate. The liquid crystal compound needs no longer exhibit liquid crystal properties. For example, a polymerizable liquid crystal compound can be imparted with a high molecular weight by a curing reaction so that it loses its liquid crystal properties.

As set forth above, in dots employing a liquid crystal material having a cholesteric structure such as those described in Patent Reference 1, since the direction in which light enters and the direction of the helical axis of the cholesteric structure differ in directions oblique to the dots, the light entering from directions oblique to the dots is thought to diffusely reflect. Accordingly, by forming cholesteric liquid dots such that, in the direction oblique to the dot, the direction of incident light entering from the oblique direction does not differ greatly from the helical axis direction of the cholesteric structure, it is possible for the dots that are formed to exhibit retroreflectivity for light entering from directions oblique to the dots.

As set forth above, in the sectional SEM image of the cholesteric liquid crystal dots, a fringe pattern of bright portions and dark portions is observed. In portions of the cholesteric liquid crystal dots that are capable of retroreflecting light entering in a direction oblique to the dots, the angle of the line normal to the line formed by the first dark portion from the surface on the opposite side from the surface on which the dot is disposed relative to the above surface in the sectional SEM image normally falls within a range of 70° to 90°. The "angle relative to the above surface" means the angle relative to the tangent of the surface. The above angle, indicated as an acute angle, signifies a range of 70° to 110° when the angle formed between the normal and the above surface is denoted as an angle of 0° to 180°. In the sectional SEM image, both the normal to the line formed by the first dark portion and the normal to the line formed by the second dark portion from the surface of the dot desirably form angles falling within a range of 70° to 90° with the above surface, with the larger the number of lines of the dark portion forming this angle, the better. The above angle desirably falls within a range of 80° to 90° and preferably falls within a range of 85° to 90°.

The above angle is given as the angle formed by the helical axis of the cholesteric structure and the above surface. In the above surface of the dot, in the direction running from the dot apex toward the surface on which the dot is disposed, in order for the helical axis of the cholesteric structure to be disposed so as to form an angle falling within a range of 70° to 90° with the above surface, it is desirable to incorporate a surfactant into the liquid crystal composition that is used to form the cholesteric liquid crystal dots.

A liquid crystal composition that is suited to forming the dots exhibiting retroreflectivity for light entering in a direction oblique to the dots will be described in greater detail below.

A liquid crystal composition containing a liquid crystal compound is an example of the material used to form the cholesteric structure. The liquid crystal compound is desirably a polymerizable liquid crystal compound.

The liquid crystal compound containing the polymerizable liquid crystal compound desirably contains a surfactant and can further contain a chiral agent and a polymerization initiator.

—Polymerizable Liquid Crystal Compound—

The polymerizable liquid crystal compound can be a rod-shaped or a disk-shaped liquid crystal compound. A rod-shaped liquid crystal compound is desirable.

Examples of rod-shaped polymerizable liquid crystal compounds that form cholesteric liquid crystal layers are rod-shaped nematic liquid crystal compounds. Rod-shaped nematic liquid crystal compounds in the form of azomethines, azoxys, cyanobiphenyls, cyanophenyl esters, benzoic acid esters, cyclohexane carboxylic acid phenyl esters; cyanophenyl cyclohexanes, cyano-substituted phenylpyrimidines, alkoxy-substituted phenyl pyrimidines, phenyl dioxanes, tolans, and alkenyl cyclohexylbenzonitriles are desirably employed. Not just low molecular weight liquid crystal compounds, but high molecular weight liquid crystal compounds can also be employed.

The polymerizable liquid crystal compound can be obtained by introducing a polymerizable group into a liquid crystal compound. Examples of polymerizable groups are unsaturated polymerizable groups, epoxy groups, and aziridinyl groups. Unsaturated polymerizable groups are desirable and ethylenic unsaturated polymerizable groups are particularly preferred. The polymerizable group can be incorporated into the molecule of the liquid crystal compound by various methods. The number of polymerizable groups present in the polymerizable liquid crystal compound is desirably 1 to 6, preferably 1 to 3. Examples of polymerizable liquid crystal compounds are included among the compounds described in Makromol. Chem., Vol. 190, p. 2255 (1989); Advance Materials, Vol. 5, p. 107 (1993); U.S. Pat. Nos. 4,683,327, 5,622,648, and 5,770,107; WO95/22586, WO95/24455, WO97/00600, WO98/23580, and WO98/52905; JP-A-Heisei Nos. 1-272551, 6-16616, 7-110469, and 11-80081; JP-A-No. 2001-328973; and the like. Two or more polymerizable liquid crystal compounds can be employed in combination. When employing two or more polymerizable liquid crystal compounds in combination, it is possible to lower the orientation temperature.

Specific examples of polymerizable liquid crystal compounds are the compounds denoted by formulas (1) to (11) described in Japanese Patent No. 4,973,248, paragraphs 0015 and 0016. Cyclic organopolysiloxane compounds and the like having a cholesteric phase such as those disclosed in JP-A-Showa No. 57-165480 can be employed as polymerizable liquid crystal compounds other than the above. High molecular weight liquid crystal compounds in the form of polymers in which mesogenic groups exhibiting liquid crystal properties are incorporated into the main chain, a side chain, or both the main chain and a side chain; high molecular weight cholesteric liquid crystal in which cholesteryl groups are incorporated into a side chain; the liquid crystal polymers disclosed in JP-A-Heisei No. 9-133810; liquid crystal polymers such as those disclosed in JP-A-Heisei No. 11-293252; and the like can be employed.

The quantity of the polymerizable liquid crystal compound that is added to the liquid crystal composition is desirably 75 to 99.9 weight %, preferably 80 to 99 weight %, and more preferably, 85 to 90 weight %, of the solid component weight (weight excluding solvent) of the liquid crystal composition.

—Surfactant—

With regard to cholesteric liquid crystal dots exhibiting retroreflectivity for light entering from a direction oblique to the dots, the present inventors discovered that adding a surfactant to the liquid crystal composition used to form the cholesteric liquid crystal dots made it possible to horizontally orient the polymerizable liquid crystal compound on the air interface side during dot formation and obtain dots in which the direction of the helical axis was controlled as set forth above. Although it is not generally better to lower the surface tension to retain the droplet shape in the course of printing to form dots, the fact that it was still possible to form dots even when a surfactant was added and the fact that dots exhibiting retroreflectivity for light entering in a direction oblique to the dots, previously unknown, were discovered by the present inventors. A surfactant in the form of a compound capable of functioning as an orientation controlling agent that contributes to stably and rapidly obtaining a cholesteric structure with a planar orientation is desirable. Examples of desirable surfactants are silicone surfactants and fluorine surfactants, with fluorine surfactants being preferred. Specific examples of surfactants are the compounds described in JP-A-No. 2014-119605, paragraphs 0082 to 0090; the compounds described in JP-A-No. 2012-203237, paragraphs 0031 to 0034; the compounds given by way of example in JP-A-No. 2005-99248, paragraphs 0092 and 0093; the compounds given by way of example in JP-A-No. 2002-129162, paragraphs 0076 to 0078 and 0082 to 0085; and the fluorine (meth)acrylate polymer described in JP-A-No. 2007-272185, paragraphs 0018 to 0043.

A single surfactant can be employed alone, or two or more can be employed in combination.

The compound denoted by formula (I) below that is described in JP-A-No. 2014-119605, paragraphs 0082 to 0090, is particularly desirable as a fluorine surfactant.

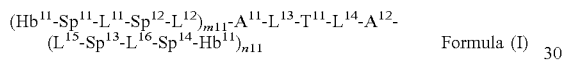

$(Hb^{11}-Sp^{11}-L^{11}-Sp^{12}-L^{12})_{m11}-A^{11}-L^{13}-T^{11}-L^{14}-A^{12}-(L^{15}-Sp^{13}-L^{16}-Sp^{14}-Hb^{11})_{n11}$  Formula (I)

In formula (I), each of $L^{11}$, $L^{12}$, $L^{13}$, $L^{14}$, $L^{15}$, and $L^{16}$ independently denotes a single bond, —O—, —S—, —CO—, —COO—, —OCO—, —COS—, —SCO—, —NRCO—, or —CONR— (with R in formula (I) denoting a hydrogen atom or an alkyl group having 1 to 6 carbon atoms); desirably denotes —O—, —S—, —CO—, —COO—, —OCO—, —COS—, or —SCO—; and preferably denotes —O—, —CO—, —COO—, or —OCO— from the perspective of compound stability. The alkyl group that can be denoted by R above can be linear or branched. It preferably has from 1 to 3 carbon atoms; examples of the alkyl group are a methyl group, ethyl group, and n-propyl group.

Each of $Sp^{11}$, $Sp^{12}$, $Sp^{13}$, and $Sp^{14}$ independently denotes a single bond or an alkylene group having 1 to 10 carbon atoms, preferably denotes a single bond or an alkylene group having 1 to 7 carbon atoms, and more preferably denotes a single bond or an alkylene group having 1 to 4 carbon atoms. However, the hydrogen atoms in the alkylene group can be replaced with fluorine atoms. The alkylene group can comprise or lack branches, and is desirably a linear alkylene group without branches. From the perspective of synthesis, it is desirable for $Sp^{11}$ and $Sp^{14}$ to be identical, and for $Sp^{12}$ and $Sp^{13}$ to be identical.

Each of $A^{11}$ and $A^{12}$ independently denotes an aromatic hydrocarbon group with a valence of 1 to 4. The aromatic hydrocarbon groups desirably comprise 6 to 22, preferably comprise 6 to 14, more preferably comprise 6 to 10, and still more preferably comprise 6 carbon atoms. The aromatic hydrocarbon groups denoted by $A^{11}$ and $A^{12}$ can comprise substituents. Examples of such substituents are alkyl groups with 1 to 8 carbon atoms, alkoxy groups, halogen atoms, cyano groups, and ester groups. Reference can be made to the description of $T^{11}$ below with regard to the description and desirable ranges of these groups. Examples of substituents on the aromatic hydrocarbon groups denoted by $A^{11}$ and $A^{12}$ are methyl groups, ethyl groups, methoxy groups, ethoxy groups, bromine atoms, chlorine atoms, and cyano groups. The addition of just a small quantity of molecules that contain many perfluoroalkyl moieties within them will orient liquid crystals. Since this relates to reducing haze, $A^{11}$ and $A^{12}$ are desirably tetravalent in a manner containing numerous perfluoroalkyl groups within the molecules. From the perspective of synthesis, it is desirable for $A^{11}$ and $A^{12}$ to be identical.

$T^{11}$ desirably denotes a divalent group or divalent aromatic heterocyclic group denoted by:

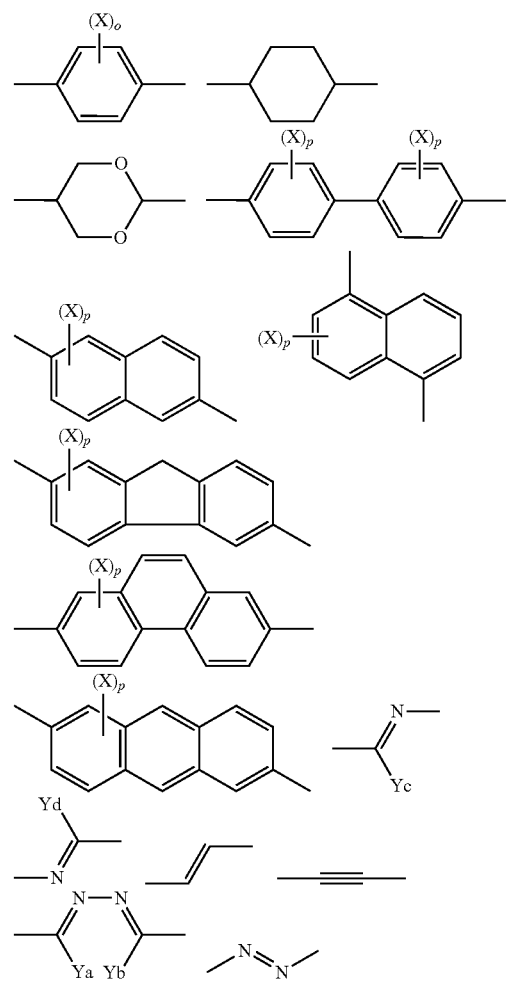

(where X contained in $T^{11}$ above denotes an alkyl group with 1 to 8 carbon atoms, alkoxy group, halogen atom, cyano group, or ester group; each of Ya, Yb, Yc, and Yd independently denotes a hydrogen atom or an alkyl group with 1 to 4 carbon atoms); preferably denotes:

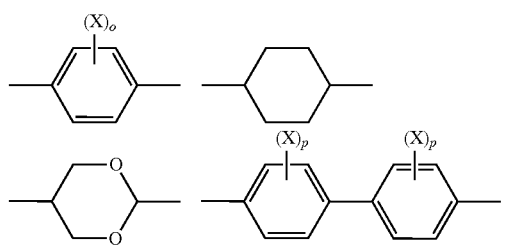

-continued

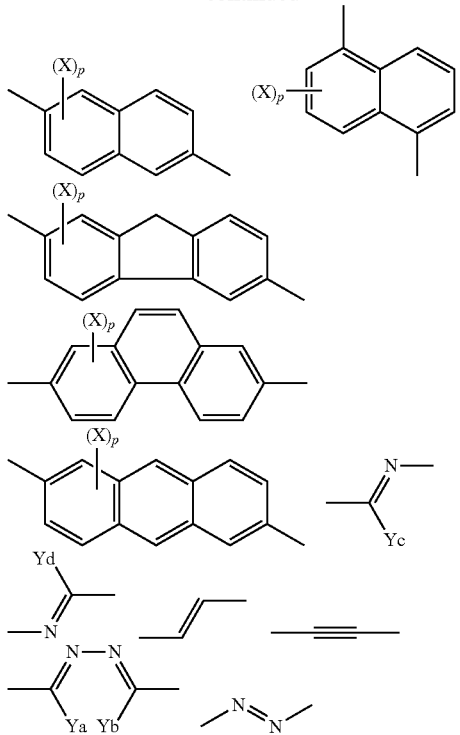

more preferably denotes:

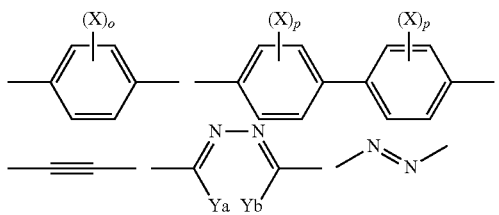

and still more preferably denotes the structure given below:

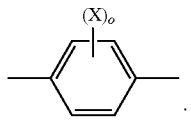

X in $T^{11}$ above can denote an alkyl group with 1 to 8 carbon atoms, desirably denotes an alkyl group with 1 to 5 carbon atoms, and preferably denotes an alkyl group with 1 to 3 carbon atoms. The alkyl group can be linear, branched, or cyclic, with a linear or branched alkyl group being desirable. Examples of desirable alkyl groups are a methyl group, ethyl group, n-propyl group, or isopropyl group. Of these, a methyl group is desirable. Reference can be made to the description and desirable range of the alkyl group denoted by X in $T^{11}$ above for the alkyl moiety of the alkoxy group that can be denoted by X in $T^{11}$ above. Examples of halogen atoms that can be denoted by X contained in $T^{11}$ above are a fluorine atom, chlorine atom, bromine atom, and iodine atom, with a chlorine atom or bromine atom being desirable. The groups denoted by R'COO— are examples of the ester group that can be denoted by X in $T^{11}$ above. An example of R' is an alkyl group having 1 to 8 carbon atoms. Reference can be made to the description and desirable range of the alkyl group that can be denoted by X in $T^{11}$ above for the description and desirable range of the alkyl group that can be denoted by R'. Specific examples of ester groups are $CH_3COO$— and $C_2H_5COO$—. The alkyl groups with 1 to 4 carbon atoms that can be denoted by Ya, Yb, Yc, and Yd can be linear or branched. Examples are methyl groups, ethyl groups, n-propyl groups, and isopropyl groups.

The divalent aromatic heterocyclic group desirably comprises a five-membered, six-membered, or seven-membered hetero ring. A five-membered or six-membered ring is desirable, and a six-membered ring is optimal. Examples of desirable hetero atoms constituting the hetero ring are nitrogen atoms, oxygen atoms, and sulfur atoms. The hetero ring is desirably an aromatic hetero ring. Aromatic hetero rings are generally unsaturated hetero rings. Unsaturated hetero rings having a maximum number of double bonds are preferred. Examples of hetero rings are furan rings, thiophene rings, pyrrole rings, pyrroline rings, pyrrolidine rings, oxazole rings, isooxazole rings, thiazole rings, isothiazole rings, imidazole rings, imidazoline rings, imidazolidine rings, pyrazole rings, pyrazoline rings, pyrazolidine rings, triazole rings, furazan rings, tetrazole rings, pyran rings, thiin rings, pyridine rings, piperidine rings, oxazine rings, morpholine rings, thiazine rings, pyridazine rings, pyrimidine rings, pyrazine rings, piperazine rings, and triazine rings. Divalent heterocyclic groups can comprise substituents. Reference can be made to the description relating to substituents that can be present on the monovalent to tetravalent aromatic hydrocarbons of $A^1$ and $A^2$ above for a description of examples and desirable scopes of such substituents.

$Hb^{11}$ denotes a perfluoroalkyl group with 2 to 30 carbon atoms, preferably a perfluoroalkyl group with 3 to 20 carbon atoms, and more preferably, a perfluoroalkyl group with 3 to 10 carbon atoms. The perfluoroalkyl group can be linear, branched, or cyclic; is desirably linear or branched; and is preferably linear.

Each of m11 and n11 independently denotes an integer falling within a range of 0 to 3, with m11+n11≥1. The multiple structures in the parentheses that are present can be mutually identical or different, and are desirably mutually identical. In formula (I), m11 and n11 are determined by the valences of $A^{11}$ and $A^{12}$, with desirable ranges also being determined by the desirable ranges of the valences of $A^{11}$ and $A^{12}$.

Each of o and p in $T^{11}$ independently denotes an integer that is greater than or equal to 0. The multiple X when o and p are greater than or equal to 2 can be mutually identical or different. In $T^{11}$, o desirably denotes 1 or 2. In $T^{11}$, p desirably denotes an integer of 1 to 4 and preferably denotes 1 or 2.

The compound denoted by formula (I) can have a molecular structure with symmetry, or one that lacks symmetry. The "symmetry" that is referred to here refers to at least one from among point symmetry, line symmetry, or rotational symmetry, and "asymmetry" refers to a molecular structure that corresponds to neither point symmetry, line symmetry, or rotational symmetry.

The compound denoted by formula (I) is a compound that combines the above-described perfluoroalkyl group ($Hb^{11}$), linking groups -(-$Sp^{11}$-$L^{11}$-$Sp^{12}$-$L^{12}$)$_{m11}$-$A^{11}$-$L^{13}$- and -$L^{14}$-$A^{12}$-($L^{15}$-$Sp^{13}$-$L^{16}$-$Sp^{14}$-)$_{n11}$-, and desirably $T^{11}$ in the form of a divalent group having a volume-excluding effect. The two perfluoroalkyl groups ($Hb^{11}$) that are present in the molecule are desirably mutually identical, and the linking groups $-(-Sp^{11}-L^{11}-Sp^{12}-L^{12})_{m11}-A^{11}-L^{13}-$ and $-L^{14}-A^{12}-(L^{15}-Sp^{13}L^{16}-Sp^{14}-)_{n11}-$ that are present within the molecule are desirably mutually identical. The terminal $Hb^{11}-Sp^{11}-L^{11}-Sp^{12}-$ and $-Sp^{13}-L^{16}-Sp^{14}-Hb^{11}$ are desirably groups denoted by the following formulas:

$(C_aF_{2a+1})\text{—}(C_bH_{2b})\text{—}$ $(C_aF_{2a+1})\text{—}(C_bH_{2b})\text{—O—}(C_rH_{2r})\text{—}$ $(C_aF_{2a+1})\text{—}(C_bH_{2b})\text{—COO—}(C_rH_{2r})\text{—}$ $(C_aF_{2a+1})\text{—}(C_bH_{2b})\text{—OCO—}(C_rH_{2r})\text{—}$ In the above formulas, a desirably denotes an integer falling within a range of 2 to 30, preferably an integer falling within a range of 3 to 20, and more preferably, an integer falling within a range of 3 to 10. b desirably denotes an integer falling within a range of 0 to 20, preferably an integer falling within a range of 0 to 10, and more preferably, an integer falling within a range of 0 to 5. a+b is an integer falling within a range of 3 to 30. r desirably denotes an integer falling with a range of 1 to 10, preferably 1 to 4.

The terminal $Hb^{11}-Sp^{11}-L^{11}-Sp^{12}-L^{12}-$ and $-L^{15}-Sp^{13}-L^{16}-Sp^{14}-Hb^{11}$ in formula (I) are desirably groups denoted by the following formulas:

$(C_aF_{2a+1})\text{—}(C_bH_{2b})\text{—O—}$ $(C_aF_{2a+1})\text{—}(C_bH_{2b})\text{—COO—}$ $(C_aF_{2a+1})\text{—}(C_bH_{2b})\text{—O—}(C_rH_{2r})\text{—O—}$ $(C_aF_{2a+1})\text{—}(C_bH_{2b})\text{—CO—}(C_rH_{2r})\text{—COO—}$ $(C_aF_{2a+1})\text{—}(C_bH_{2b})\text{—OCO—}(C_rH_{2r})\text{—COO—}$ The definitions of a, b, and r in the above formulas are the same as those of the above.

asymmetric compounds that do not contain asymmetric carbon atoms can also be employed as chiral agents. Examples of planar asymmetric compounds and axial asymmetric compounds are binaphthyl, helicene, paracyclophane, and derivatives thereof. The chiral agent can comprise a polymerizable group. When both the chiral agent and the liquid crystal compound comprise polymerizable groups, a polymerization reaction of the polymerizable chiral agent and polymerizable liquid crystal compound can be used to form a polymer comprising a repeating unit derived from the polymerizable liquid crystal compound and a repeating unit derived from the chiral agent. In this embodiment, the polymerizable group that is present in the polymerizable chiral agent is desirable a group of the same type as the polymerizable group that is present in the polymerizable liquid crystal compound. Accordingly, the polymerizable group of the chiral agent is desirably an unsaturated polymerizable group, epoxy group, or aziridinyl group, preferably an unsaturated polymerizable group, and more preferably, an ethylenic unsaturated polymerizable group.

The chiral agent can also be a liquid crystal compound.

It is desirable for the chiral agent to comprise a photoisomerizable group to permit the formation of a pattern of desired reflection wavelength corresponding to the emission wavelength by irradiating a photomask with active light following coating and orientation. The photoisomerizable group is desirably an isomerizable moiety of a compound exhibiting photochromicity, or an azo, azoxy, or cinnamoyl group. The compounds described in JP-A-Nos. 2002-80478, 2002-80851, 2002-179668, 2002-179669, 2002-179670, 2002-179681, 2002-179682, 2002-338575, 2002-338668, 2003-313189, and 2003-313292 can be employed as specific compounds.

The compound denoted by formula (12) below is a specific example of a chiral agent.

(12)

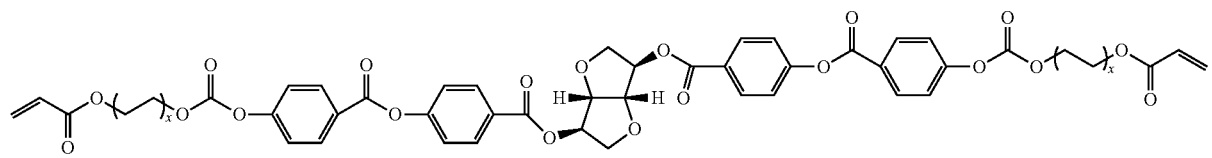

In the formula, X denotes 2 to 5 (an integer).

In the liquid crystal composition, the content of the chiral agent is desirably 0.01 to 200 mol %, preferably 1 to 30 mol %, of the quantity of the polymerizable liquid crystal compound.

—Polymerization Initiator—

The liquid crystal composition desirably contains a polymerization initiator when it contains a polymerizable compound. In an embodiment in which the polymerization reaction is proceeded by UV irradiation, the polymerization initiator employed is desirably a photopolymerization initiator that is capable of starting a polymerization reaction when irradiated with UV radiation. Examples of photopolymerization initiators are α-carbonyl compounds (see the various description in U.S. Pat. Nos. 2,367,661 and 2,367,670); acyloin ether (described in U.S. Pat. No. 2,448,828); α-hydrocarbon-substituted aromatic acyloin compounds (described in U.S. Pat. No. 2,722,512); polynuclear quinone compounds (described in U.S. Pat. Nos. 3,046,127 and In the liquid crystal composition, the quantity of surfactant added is desirably 0.01 to 10 weight %, preferably 0.01 to 5 weight %, and more preferably, 0.02 to 1 weight %, of the total weight of the polymerizable liquid crystal compound.

—Chiral Agent (Optically Active Compound)—

The chiral agent functions to induce a helical structure in the cholesteric liquid crystal phase. Since different chiral compounds induce different helical twist directions or helical pitches, the chiral agent can be selected based on the objective.

The chiral agent is not specifically limited. Known compounds (such as those described in the *Liquid Crystal Device Handbook*, Chapter 3, Section 4-3, TN and STN Chiral Agents, p. 199, comp. by the 142nd Committee of the Japan Society for the Promotion of Science, 1989), isosorbide, and isomannide derivatives can be employed.

The chiral agent usually contains asymmetric carbon atoms, however, planar asymmetric compounds or axial 2,951,758); combinations of triarylimidazole dimers and p-aminophenyl ketones (described in U.S. Pat. No. 3,549, 367); acrylidine and phenazine compounds (described in JP-A-Showa No. 60-105667 and U.S. Pat. No. 4,239,850); and oxadiazole compounds (described in U.S. Pat. No. 4,212,970).

The content of photopolymerization initiator in the liquid crystal composition is desirably 0.1 to 20 weight %, preferably 0.5 to 12 weight %, of the content of polymerizable liquid crystal compound.

—Crosslinking Agent—

The liquid crystal composition can optionally contain a crosslinking agent to enhance the film strength following curing and to enhance durability. A crosslinking agent that is cured by UV radiation, heat, moisture, or the like can be suitably employed.

The crosslinking agent is not specifically limited and can be suitably selected based on the objective. Examples are trimethylol propane tri(meth)acrylate, pentaerythritol tri (meth)acrylate, and other multifunctional acrylate compounds; glycidyl (meth)acrylate, ethylene glycol diglycidyl ether, and other epoxy compounds; 2,2-bishydroxymethyl butanol-tris[3-(1-aziridinyl)propionate], 4,4-bis(ethyleneiminocarbonylamino)diphenylmethane, and other aziridine compounds; hexamethylene diisocyanate, biuret-type isocyanates, and other isocyanate compounds; polyoxazoline compounds having oxazoline groups in side chains; and vinyltrimethoxysilane, N-(2-aminoethyl)-3-aminopropyltrimethoxysilane, and other alkoxysilane compounds. Known catalysts can be employed based on the reactivity of the crosslinking agent, making it possible to enhance productivity in addition to enhancing film strength and durability. These can be employed singly or in combinations of two or more.

The content of the crosslinking agent is desirably 3 to 20 weight %, preferably 5 to 15 weight percent. When the content of the crosslinking agent is less than 3 weight %, an effect of enhancing crosslinking density is sometimes not achieved. When it exceeds 20 weight %, the stability of the cholesteric liquid crystal layer sometimes ends up dropping.

—Other Additives—

When the inkjet method described further below is employed as the method of forming dots, it is possible to employ a monofunctional polymerizable monomer to achieve the ink properties that are generally required. Examples of monofunctional polymerizable monomers are 2-methoxyethyl acrylate, isobutyl acrylate, isooctyl acrylate, isodecyl acrylate, and octyl/decyl acrylate.

It is possible to add polymerization inhibitors, oxidation inhibitors, UV radiation absorbing agents, photostabilizing agents, coloring materials, metal oxide microparticles, and the like as needed to the liquid crystal composition to the extent that the optical performance and the like are not compromised.

The liquid crystal composition is desirably employed in the form of a liquid when forming the dots.

The liquid crystal composition can contain a solvent. The solvent is not specifically limited and can be suitably selected based on the objective. An organic solvent is desirably employed.

The organic solvent is not specifically limited and can be suitably selected based on the objective. Examples are ketones such as methyl ethyl ketone and methyl isobutyl ketone; alkyl halides; amides; sulfoxides; heterocyclic compounds; hydrocarbons; esters; and ethers. These can be employed singly or in combinations of two or more. Of these, when the environmental burden is taken into account, the ketones are particularly desirable. The above components such as monofunctional polymerizable monomers can also function as solvents.

The liquid crystal composition can be applied to the surface on which the dots are to be disposed and then cured to form dots. The liquid crystal composition is desirably applied to the surface on which the dots are to be disposed in the form of droplets. In the course of applying multiple (normally a large number of) dots to the surface, it suffices to print the liquid crystal composition as ink. The printing method is not specifically limited. It is possible to employ an inkjet method, gravure printing method, flexographic printing method, or the like. An inkjet method is desirable. Dot patterns can also be formed by applying known printing techniques.

The liquid crystal composition that is applied to the surface on which the dots are to be disposed can be dried or heated as necessary, and then cured. In the drying or heating step, it suffices to orient the polymerizable liquid crystal compound in the liquid crystal composition. When conducting heating, the heating temperature is desirably less than or equal to 200° C., preferably less than or equal to 130° C.

The liquid crystal compound that has been oriented need only be polymerized. The polymerization can be conducted by either thermal polymerization or photopolymerization by irradiation with light. Photopolymerization is desirable. Light irradiation is desirably conducted using UV radiation. The irradiation energy is desirably 20 mJ/cm$^2$ to 50 J/cm$^2$, preferably 100 mJ/cm$^2$ to 1,500 mJ/cm$^2$. To promote the photopolymerization reaction, it suffices to conduct the irradiation with light under heating conditions or in a nitrogen atmosphere. The wavelength of the UV radiation that is irradiated is desirably 250 to 430 nm. From the perspective of stability, a high polymerization reaction rate of greater than or equal to 70% is desirable, and greater than or equal to 80% is preferred.

The polymerization reaction rate can be determined with the infrared (IR) absorption spectrum of the consumption ratio of polymerizable functional groups.

(Surface on which the Dots are Disposed)

By way of example, the surface on which dots formed as set forth above are disposed can be a surface of glass, triacetyl cellulose (TAC), polyethylene terephthalate (PET), polycarbonate, polyvinyl chloride, acrylic, polyolefin, or some other support, or the surface of a layer that is provided on a support. The layer that is provided on a support can be, for example, a resin layer. However, there is no specific limitation. The resin layer can be formed by coating and curing a composition containing a polymerizable compound on the surface of a support, for example. Examples of polymerizable compounds are compounds without liquid crystallinity such as (meth)acrylate monomers and urethane monomers.

(Other Layers that can be Provided on the Dot Pattern)

It suffices for the dot pattern to be exposed on the outermost surface of the input surface of the input medium; one or more additional layers can be present on the dot pattern. For example, the dot pattern can be buried by an overcoat layer formed on the dot pattern. One or more layers can be additionally laminated over the overcoat layer. It is desirable to provide one or more additional layers on the dot pattern so that the dots do not come in direction contact with the input unit during the inputting of information with the input unit from the perspective of enhancing the durability of the dot pattern relative to when the dots are exposed on the outermost surface of the input surface of the input medium. The additional layers can be, for example, layers of known resins or glass sheets. However, there is no specific limitation.

<Input Unit>

The input unit that inputs information such as text information or image information will be described next.

From the perspective of facilitating input by the human hand, the input unit is desirably in the form of a pen. In one embodiment, it can be a handwriting input pen for writing text or drawing images. It is not necessary to trace the displacement path on the input medium; the input unit may be a pointing device for indicating some position on the input medium.

An embodiment of a handwriting input pen will be described next with reference to the drawings. However, the input unit in the present invention is not limited to the following embodiment, and can be in any form without limitation to the form of a pen.

FIG. 1 is a descriptive drawing showing the schematic configuration of a handwriting input pen that is an embodiment of the input unit. Handwriting input pen 10 shown in FIG. 1 is equipped with an illuminating part 11, an object lens 12, an image pickup element 13, a pen tip 15, a pen pressure detecting part 16, an incline sensor 17, a control part 18, a battery 19, and a communicating part 21. Pen tip (input unit tip) 15 is displaced across the input surface of input medium 20 and traces text or an image. Illuminating part 11 and object lens 12 are disposed in the vicinity of pen tip 15. Image pickup part 14, which is comprised of object lens 12 and image pickup element 13, receives the light that has reflected off the dots on the input medium and, through object lens 12, causes an optical image to be formed on image pickup element 13. The dots that have reflected light are detected. Image pickup part 14 can contain one or more lenses in addition to object lens 12.

The configuration and operating mechanism of the handwriting input pen shown in FIG. 1 will be described next.

Illuminating part 11 contains at least one light-emitting element. It suffices for the light-emitting element to be able to emit light in the wavelength region that the dots of the input medium are capable of reflecting. An example of the light-emitting element is a light-emitting diode (LED). Illuminating part 11 contains at least one light-emitting element, and can contain multiple such elements. The multiple light-emitting elements can simultaneously emit light or two or more of the multiple light-emitting elements can emit light in alternating fashion.

When the dots constituting the dot pattern have wavelength-selective reflectivity, the light that is irradiated onto the input medium for the detection of dots by means of reflected light is desirably light in the wavelength band that is selectively reflected by the dots. Dots that are formed of a material having the property of reflecting visible light tend to develop color and render the presence of the dots readily visible. Additionally, for example, when the input medium is disposed as the front surface plate of a display, it is desirable for the dots not to develop color, or to develop little color, so as not to decrease the visibility of the image being displayed by the display. In other cases, as well, it is desirable for the dots not to be readily visible so as to broaden the range of application of the input medium having a dot pattern. From the above perspectives, the light that is reflected by the dots is desirably not visible light. In the present invention and in the present specification, the term visible light refers to electromagnetic waves with a wavelength range of greater than or equal to 380 nm but less than 780 nm. Ultraviolet radiation is electromagnetic waves in a wavelength region longer than that of X-rays in the wavelength region below 380 nm, and is, for example, the wavelength region greater than or equal to 10 nm and less than 380 nm.

The light that is irradiated by illuminating part 11 onto input medium 20 is reflected by those dots positioned on the displacement path of pen tip 15 of handwriting input pen 10. In the embodiment shown in FIG. 1, handwriting input pen 10 is tilted by an angle θp relative to input medium 20. Accordingly, the light that is irradiated by the illuminating part enters the dots on the input medium from a direction oblique to the dots in the manner described in detail further below. The dots that are contained in the dot pattern of the input medium exhibit retroreflectivity for light entering in a direction oblique to the dots. Thus, in this manner, light that has entered in a direction oblique to the dots can be retroreflected. For example, in reflection by the dots, it is difficult for image pickup part 14 to receive the reflected light in a quantity sufficient for the detection of the dots when diffuse reflection or mirror-surface reflection is dominant. By contrast, since light reflected in the direction of incidence by retroreflectivity is obtained, reflected light (retroreflected light) can be received in image pickup part 14 of handwriting input pen 10 in a quantity adequate for the detection of the dots.

In image pickup part 14, object lens 12 forms the light reflected by the dots into an image on image pickup element 13. The image pickup part need only be able to receive the light reflected by the dots and can be disposed in any position. There is no limitation to the embodiment in which it is disposed in the position shown in FIG. 1. The same applies to the other parts constituting the configuration of the input unit. Image pickup element 13 can be, for example, a charge-coupled device (CCD) or complementary metal oxide semiconductor (CMOS) sensor. Image pickup part 13 is disposed on the optical axis of object lens 12. Image pickup element 13 detects the image that has been formed through object lens 12. The dots that have reflected the light irradiated by the illuminating part are detected here as an image. The image that is obtained is not necessarily indicated by all the dots, but can be formed as an image by at least a portion of the dots that have reflected light. In this manner, the dots that are positioned on the displacement path of handwriting input pen 10 can be continuously detected as an image. The information of the image that has been detected is converted to the position information of the dot pattern formed by the multiple dots that have been detected as an image in control part 18. The input unit can be equipped with a wireless or wired information transmitting part (communicating part 21 in FIG. 1) for transmitting the information to other components. The information transmitting part, for example, can transmit the input information obtained by the input unit to an information displaying part that displays the information. In one embodiment, the information displaying part can be contained in the input medium. In the present embodiment, the input medium, for example, can be disposed as the front surface plate of an information displaying part which displays input information. Alternatively, in another embodiment, the information displaying part can be provided in a separate display device from the input medium.

Handwriting input pen 10 in FIG. 1 comprises a pen pressure detecting part 16 linked to pen tip 15. Pen pressure detecting part 16 includes, for example, a pen pressure sensor. The pen pressure sensor can detect, for example, changes in the resistance value of conductive rubber or change in the electrostatic capacitance between electrodes.

Pen pressure detecting part 16 detects the pressure applied to pen tip 15 when the user uses handwriting input pen 10 to write a text or draw an image on the surface of input medium 20. Pen pressure detecting part 16 can recognize the start of input by detecting pressure and activates the illuminating part and the image pickup part. It can also detect the removal of pressure (the separation of pen tip 15 from the surface of input medium 20), and can transmit an ON/OFF signal to stop the illuminating part and image pickup part on that basis.

Pen tip 15 can have the same pen tip shape as a common writing instrument, such as a ballpoint pen, and is not specifically limited.

It suffices for battery 19 to supply power to each of the constituent parts of handwriting input pen 10.

In the information processor according to an aspect of the present invention, the input unit is equipped with an input unit angular position measuring part (incline sensor 17 in the embodiment show in FIG. 1) that measures the angular position (also referred to as the "tilt angle" below; for example, the angle θp shown in FIG. 1) of the input unit when the input unit irradiates light by the illuminating part in the course of displacing the tip of the input unit on the input surface of the input medium. It does not matter where the input unit angular position measuring part is disposed. In the embodiment shown in FIG. 1, the input unit angular position measuring part (incline sensor 17) is built into the input unit, but it can also be mounted on the external surface of the input unit. An angle sensor of known configuration can be employed as the input unit angular position measuring part. Examples of such angle sensors are gravity sensors, acceleration sensors, and gyrosensors. In FIG. 1, the angle formed between the input unit and the input medium is indicated as the angle (angle θp) formed between the vertical direction relative to the input surface of the input medium and the axial direction of the pen tip of handwriting input pen 10. However, the angle at any position indicating the degree of incline of the input medium can serve as the angle that is measured.

The position misalignment between the above described brightness center and dot center will be described next with reference to FIG. 2.

Figure 2:
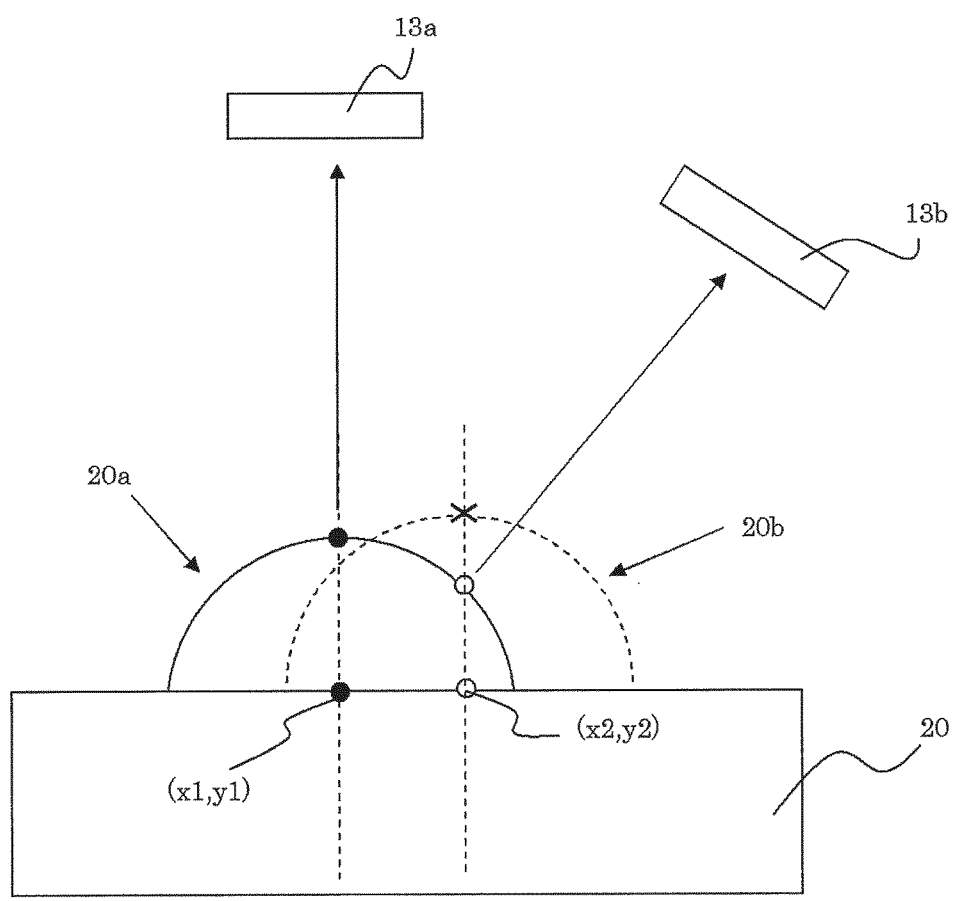
FIG. 2 is a descriptive drawing of the position misalignment of the brightness center and dot center.

In FIG. 2, numeral 13a indicates the position of image pickup element 13 in a state in which handwriting input pen 10 shown in FIG. 1 is vertically erect (referred to as the vertical state hereinafter) without an incline relative to the surface of input medium 20. Conversely, numeral 13b indicates the position of image pickup element 13 in a state (referred to as an inclined state hereinafter) in which handwriting input pen 10 is inclined relative to the surface of input medium 20. Dot 20a shown in FIG. 2 exhibits retroreflectivity in the dot apex and also exhibits retroreflectivity for light entering from a direction oblique to the dot. In the vertical state, the brightness center is located at the position coordinates of the dot apex, that is, the position coordinates of the center of the dot (x1, y1). Conversely, the brightness center in the inclined state is indicated by the hollow white circle on the side surface of the dot. Unless any correction processing is not applied, in the detection results of image pickup element 13, the dot (virtual dot 20b, the dot indicated by the dotted line in FIG. 2) will be detected as having the position coordinates of the hollow white circle (x2, y2) as its center.

The above is thought to be why position misalignment occurs between the brightness center and the dot center in the inclined state.

Virtual dot 20b corresponds to a dot having the portion denoted by X in FIG. 2 as its apex. When no dot with its center at position coordinates (x2, y2) is present in the dot pattern being coded, the position coordinates of the dot pattern containing the detected dot cannot be specified on the input surface. As a result, the position information on the dot pattern containing this dot end up differing greatly from the position coordinates of the dot pattern on the input surface. A reading error ends up being generated without specifying the position (position irradiated with light) at which information is being inputted by the input medium on the input surface.

Accordingly, the information processor according to an aspect of the present invention corrects this position misalignment based on the angular position (incline angle) measured by the input unit angular position measuring part. A specific form of correction processing will be described below based on the drawings.

Figure 3:
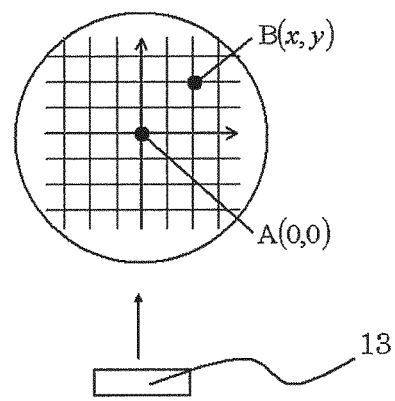
FIG. 3 is a descriptive drawing showing specifically how correction processing is conducted.
Figure 3:
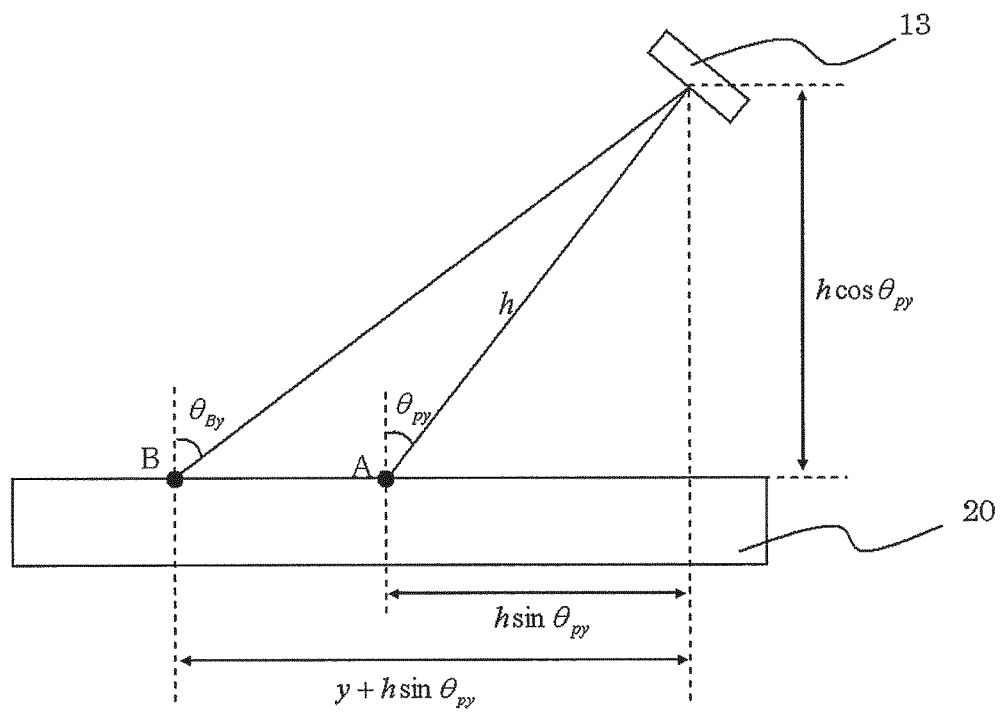

FIG. 3(A) is a drawing showing a coordinate system that has been established to facilitate description on the image that is being picked up by the image pickup element.

FIG. 3(B) is a drawing showing the cross section in the y direction (the x direction is projected) of FIG. 3(A). It shows the positional relation between point A (0, 0) at the center of the image, point B (x, y), and the image pickup part. Point A gives the position coordinates of the brightness center and point B gives the position coordinates of the center of the dot the image of which is being picked up.

In FIG. 3(B), the angle $\theta_{By}$ formed by the straight line connecting point B (x, y) and the image pickup element and the vertical direction relative to the input surface of the input medium are denoted by Equation 1 below using the distance h between the input surface of the input medium and the image pickup element, and the tilt $\theta_{Py}$ of handwriting input pen 10.

$$\theta_{By} = \arctan\left(\frac{y + h\ \sin\theta_{py}}{h\cos\theta_{py}}\right) \quad \text{(Equation 1)}$$

Figure 4:
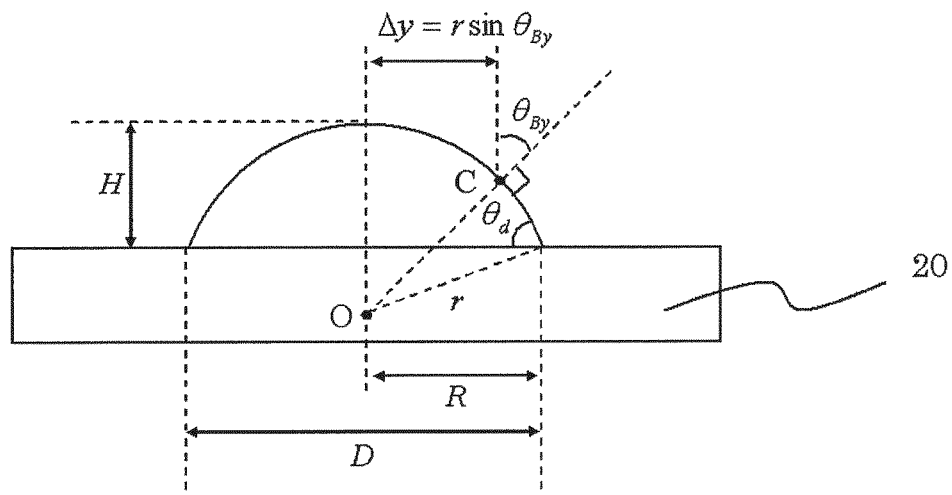
FIG. 4 is a schematic sectional view of a dot the image of which is being picked up by the image pickup part of the input unit.

Additionally, a schematic sectional view of the dot the image of which is being picked up by the image pickup part is shown in FIG. 4. The position producing the strongest reflected light by retroreflectivity on the surface of the dot is the position where the light incident on the dot is entering vertically, indicated by point C in the figure. The position coordinates of point C are those of point A in FIG. 3. Additionally, the dot center is point B in FIG. 3. Accordingly, a position misalignment of distance Δy has been produced between the brightness center and the dot center. Position misalignment Δy can be obtained by Equation 2 below using the radius of curvature r of the dot.

$$\Delta y = r \sin \theta_{By} \quad \text{(Equation 2)}$$

For example, when the dot is a cholesteric liquid crystal dot, since cholesteric liquid crystal dots are normally formed much smaller than the capillary length, with the surface tension being predominant, a partial spherical shape (ball cap shape) in the form of a partially truncated sphere is adopted. Accordingly, radius of curvature r of a cholesteric liquid crystal dot can be represented with Equation 3 below using the height H and the contact radius R of the dot and the input surface of the input medium.

$$r = \frac{R^2 + H^2}{2H} \quad \text{(Equation 3)}$$

In this manner, the position misalignment between the dot center and the brightness center in the y direction can be corrected. The x direction coordinates in FIG. 3(A) can be conceived of in the same manner as the y direction coordinates. Denoting the position misalignment distance between the dot center and the brightness center in the x direction as $\Delta x$, $\Delta x$ can be calculated from Equation 4 below using the tilt (denoted as "$\theta_{px}$" below) of the handwriting input pen in the x direction.

$$\theta_{Bx} = \arctan\left(\frac{x + h\sin\theta_{px}}{h\cos\theta_{px}}\right) \quad \text{(Equation 4)}$$

$$\Delta x = r\sin\theta_{Bx}$$

As set forth above, from the incline angle of the input unit (handwriting input pen 10), shape information about the dot, and position information about the brightness center of the dot detected by the image pickup part, it is possible to determine the position misalignment distance in the x direction and y direction of the brightness center and the dot center. The position coordinates of the center of the osculating circle, that is, the dot center, can be calculated. As set forth above, when the input medium is employed with a tilt, when the brightness center of the dot that is detected by the image pickup part is adopted as the dot center, and when attempting to specify the position coordinates on the input surface of a dot pattern containing this dot, a reading error ends up being generated because a determination is made that no dot is present that matches the position coordinates detected in the dot pattern being coded. By contrast, when conducting such correction processing, it is possible to reduce the rate at which errors are generated.

It is possible to implement the above correction processing for the brightness center of each dot detected by the image pickup part, obtain position information (correction processed position information) for the dot pattern using the corrected position coordinates of the dots, and based on this position information, specify the position coordinates of the position on the input surface that has been irradiated with light by the input unit and obtain input information. The position information can be obtained and the position coordinates of the position on the input surface irradiated with light can be specified based on the position information by a known technique such as the method described in Japanese Patent 4,658,427. Even when the position information (correction processed position information) of the dot pattern that has been detected by the image pickup part and correction processed does not fully match the position coordinates of the dot pattern being coded on the input surface, so long as the error is within the range accepted in the field of art to which the present invention belongs, it is possible to specify the position coordinates.

The equation for correction that is set forth above is an example; the position coordinates of the brightness center of dots detected by the image pickup part can be corrected by various equations based on the incline angle. Further, the input unit can include the period when the incline angle goes to 0° (the vertical state) while the input unit is displaced on the input surface of the input medium.

<Optional Configuration and Correction Processing>

The following embodiment is another example of correction processing.

In one embodiment, an angular position measuring part that measures the angular position of the input medium specified by the angle formed by the input surface of the input medium with a reference plane such as the horizontal plane can be provided in the input medium or in some portion other than the input medium of the information processor. By way of example, the various sensors given as examples for the input unit angular position measuring part can be employed as such an input medium angular position measuring part. For example, in a state where the input medium is not parallel to a reference plane such as the horizontal plane, but is inclined relative to the reference plane, and information is being inputted by the input unit, it is possible to conduct correction processing based on the angular position (the position specified based on the angle of incline from the reference plane; also referred to hereinafter as the incline angle of the input medium) measured by the input medium angular position measuring part and obtain correction processed position information. As an example, it suffices to replace θp in Equations 1 and 4 above (more specifically, θpy in the y direction and px in the y direction) with the difference ($\theta^1 p$ determined by Equation 5 below) between the incline angle θp of the input unit measured by the input unit angular position measuring part and the incline angle $\theta_D$ of the input medium measured by the input medium angular position measuring part. The input medium incline angle $\theta_D$ is the incline angle specified within a range of greater than or equal to 0° and less than or equal to 90° when the direction parallel to the horizontal plane is 0° and the direction perpendicular to the horizontal plane is 90°.

$$\theta^1 p = \theta p - \theta_D \quad \text{(Equation 5)}$$

Figure 5:
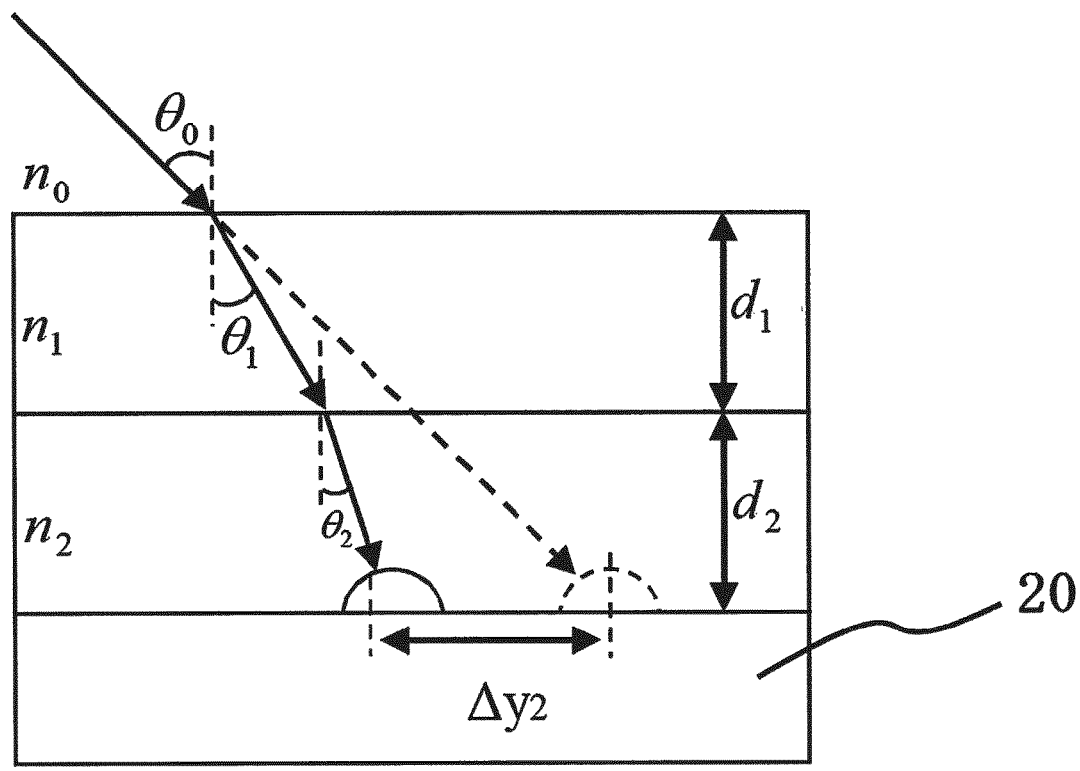
FIG. 5 is a descriptive drawing showing specifically how correction processing is conducted when another layer is present over the pattern layer.

In one embodiment, as stated above, the input medium can contain a pattern layer having a dot pattern and another layer provided over the pattern layer. When another such layer is present, the input medium surface that is irradiated with light by the illuminating part of the input unit becomes the surface of another such layer provided on the pattern layer. Layer numbers are assigned in the order first, second, . . . from side of the surface of the input medium. The $i^{th}$ layer contacts the pattern layer. The refractive index of the first layer is denoted as n1, the thickness thereof as d1, the refractive index of the second layer is denoted as n2, the thickness thereof as d2, . . . The refractive index of the $i^{th}$ layer is denoted as ni and the thickness of the $i^{th}$ layer as di. n0 is the refractive index of the air layer. FIG. 5 is a descriptive drawing specifically showing how correction processing is conducted when another layer is present on the pattern layer for the case where i=2. The entering light refracts according to Snell's law, so a position misalignment ends up being produced based on the refractive index and thickness of the individual layers. In this case, the corrected incline angle $\theta^2 p$ is represented as shown in Equation 6. The corrected incline angle $\theta^2 p$ determined from Equation 6 is substituted for the above incline angle θp and applied to Equation 1 above. The $\theta_{By}$ that is thus calculated is substituted into Equation 7 to obtain the position misalignment distance $\Delta y2$, which can be used to correct the position coordinates. θp in Equation 6 can be replaced with $\theta^1 p$ calculated in Equation 5. In $\theta^1 p$ and $\theta^2 p$ above, the numbers 1 and 2 added to θ do not denote exponents, but are merely symbols added for differentiation.

$$\theta_p^2 = \arcsin\left(\frac{\sin\theta_p}{n_i}\right) \quad \text{(Equation 6)}$$

$$\Delta y_2 = \sum_i d_i(\tan\theta_p - \tan\theta_i) + r\sin\theta_{By} \quad \text{(Equation 7)}$$

<Examples of Flowcharts of Specific Implementation Modes>

Figure 6:
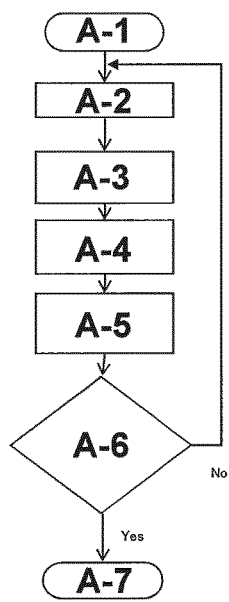
FIG. 6 shows an example of flowcharts of specific implementation modes of conducting correction processing and obtaining input information.
Figure 6:
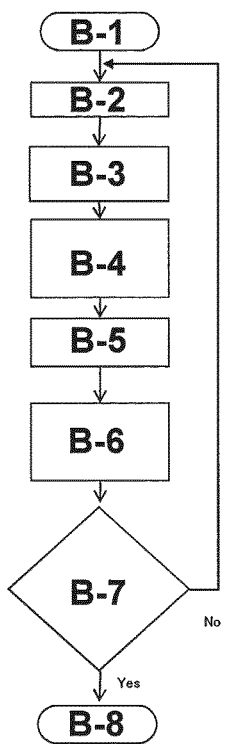
Figure 6:
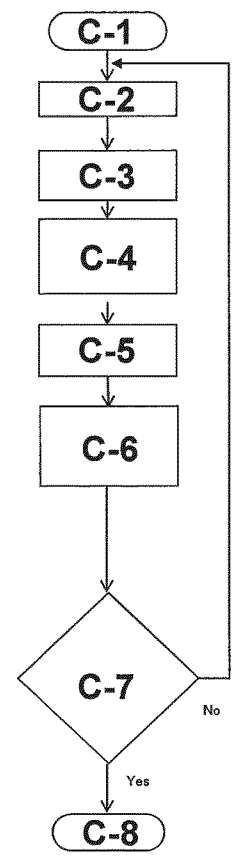

Examples of flowcharts of specific implementation modes of obtaining correction processed position information by conducting the correction processing set forth above are given in FIGS. 6(A) to (C). FIG. 6(A) is a flowchart of an implementation mode of correction processing based on the results of measurement by the input unit angular position measuring part. FIG. 6(B) is a flowchart of an implementation mode of correction processing in which correction is made based on measurement results obtained by the input medium angular position measuring part. FIG. 6(C) is a flowchart of an implementation mode of further correction processing of the position misalignment in the direction of thickness based on Equation 6 set forth above in the implementation mode shown in FIG. 6(B). The farther to the right the flowchart of an implementation mode is shown in the figure, the more desirable it is from the perspective of further enhancing precision in the specification of position coordinates. Among FIGS. 6(A) to (C), the implementation mode of the flowchart shown in FIG. 6(C) is the most desirable. The details of the individual steps shown in each of the flowcharts are as described above.

A-1 to A-7 in FIG. 6(A) are as follows:
A-1: Input starts;
A-2: Image is picked up by image pickup part;
A-3: Position coordinates of dot brightness center is obtained;
A-4: Measurement by input unit angular position measuring part;
A-5: Correction processing of position coordinates of dot brightness center based on the measurement result;
A-6: Whether the above steps were conducted for each detected dot?
A-7: Finish.
B-1 to B-8 in FIG. 6(B) are as follows:
B-1: Input starts;
B-2: Image is picked up by image pickup part;
B-3: Position coordinates of dot brightness center is obtained;
B-4: Measurement by input unit angular position measuring part and input medium angular position measuring part;
B-5: Calculation of difference of angles
B-6: Correction processing of position coordinates of dot brightness center with the difference of angles;
B-7: Whether the above steps were conducted for each detected dot?
B-8: Finish.
C-1 to C-8 in FIG. 6(C) are as follows:
C-1: Input starts;
C-2: Image is picked up by image pickup part;
C-3: Position coordinates of dot brightness center is obtained;
C-4: Measurement by input unit angular position measuring part and input medium angular position measuring part;
C-5: Calculation of difference of angles
C-6: Correction processing of position coordinates of dot brightness center with Equation 7;
C-7: Whether the above steps were conducted for each detected dot?
C-8: Finish.

<Examples of Applying the Information Processor>

The information processor that has been set forth above can be employed in various types of information processing systems utilizing coding by dot patterns. For example, the above information processor is suitable to information processing systems conducting information management such as converting handwritten text and images to electronic information and storing and distributing it, information processing systems that conduct order management based on the results of selections made with virtual buttons, and various other information processing systems. In these information processing systems, depending on the use environment (for example, cases where the user employs an information processor while standing), there are cases where the use of a handwriting input pen or pointing device tilted obliquely becomes a natural operation. Generally, in cases when writing text or drawing images, the inclined use of a writing instrument relative to an input surface is the natural operation by the writer. Information that is written down by such a natural operation, as well as inputted information, can be processed by the information processor according to an aspect of the present invention while inhibiting reading errors.

EXAMPLES

The present invention is specifically described below through Examples. The materials, use quantities, ratios, processing contents, processing procedures, and the like that are indicated in Examples below can be suitably modified without departing from the spirit of the present invention. Accordingly, the scope of the present invention is not limited to the specific examples given below.

Example 1

(Fabrication of an Under Layer)

The following composition was stirred and dissolved in a vessel maintained at 25° C. to prepare an under layer solution.

| Under layer solution (weight parts) | |
| --- | --- |
| Propylene glycol monomethyl ether acetate | 67.8 |
| Megafac RS-90 (made by DIC Co., Ltd.) | 26.7 |
| Irgacure 819 (made by BASF Corp.) | 0.5 |

The under layer solution prepared above was coated in a quantity of 3 mL/m$^2$ with a bar coater on a transparent PET (polyethylene terephthalate, made by Toyobo Co., Ltd., Cosmoshine A4100) support 100 μm in thickness. Subsequently, heating was conducted to a film surface temperature of 90° C. Following drying for 120 seconds, under a nitrogen purge with an oxygen concentration of less than or equal to 100 ppm, 700 mJ/cm$^2$ of UV radiation was irradiated with a UV irradiation apparatus to promote a crosslinking reaction and fabricate an under layer.

(Forming Cholesteric Liquid Crystal Dots)

The following composition was stirred and dissolved in a vessel maintained at 25° C. to prepare a cholesteric liquid crystal ink liquid (liquid crystal composition)

| Cholesteric liquid crystal ink liquid (weight parts) | |
| --- | --- |
| Methoxyethyl acrylate | 145.0 |
| Mixture of the rod-shaped liquid crystal compounds given below | 100.0 |
| Irgacure 819 (made by BASF Corp.) | 10.0 |
| Chiral agent of the structure indicated below | 3.8 |
| Surfactant of the structure indicated below | 0.08 |

Rod-Shaped Liquid Crystal Compounds

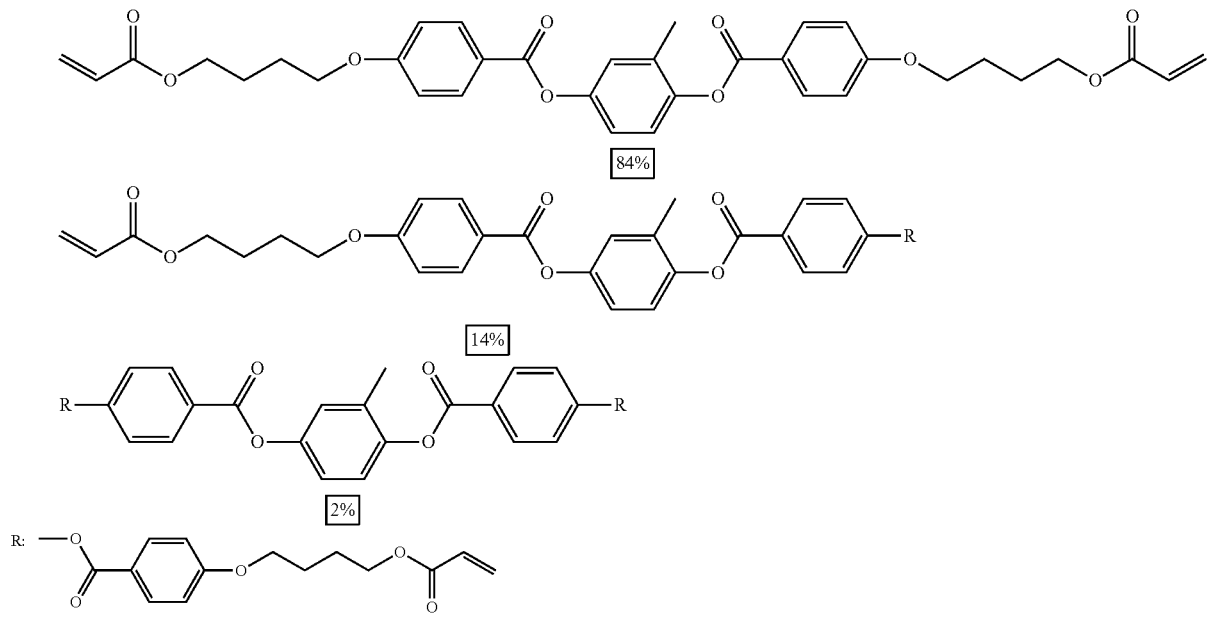

The numbers given above are weight %. The group denoted by R is the partial structure shown on the lower right; it is bonded at the site of the oxygen atom in the partial structure.

Chiral Agent

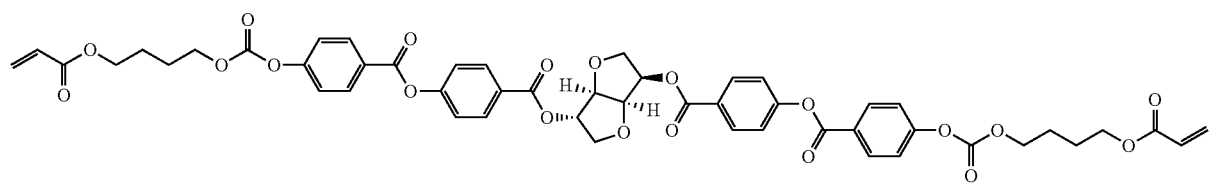 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

Surfactant

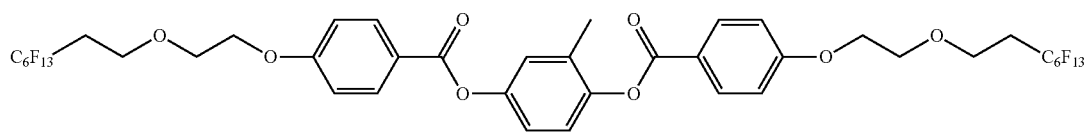

The cholesteric liquid crystal ink liquid prepared above was dripped onto the surface of the under layer to dispose a dot pattern of the Anoto type known as a technique of information processing utilizing coding by dot patterns with an inject printer (DMP-2831, made by FUJIFILM Dimatix) on the under layer on the PET support fabricated as set forth above. This was dried for 30 seconds at 95° C. and then irradiated with 500 mJ/cm² of UV radiation.

A reflective pattern printed sheet having a pattern of cholesteric liquid crystal dots on the surface of an under layer was thus obtained.

One of the cholesteric liquid crystal dots disposed on the surface of the under layer of the above reflective pattern printed sheet was cut perpendicularly with respect to the PET support through the surface containing the dot apex and the cross-section was observed with a scanning electron microscope. This yielded the sectional SEM image shown in FIG. 7 (in the sectional SEM image shown in FIG. 7, the portion to the outside of the semicircle shape on the right side is a burr that emerged during cutting).

Figure 7:
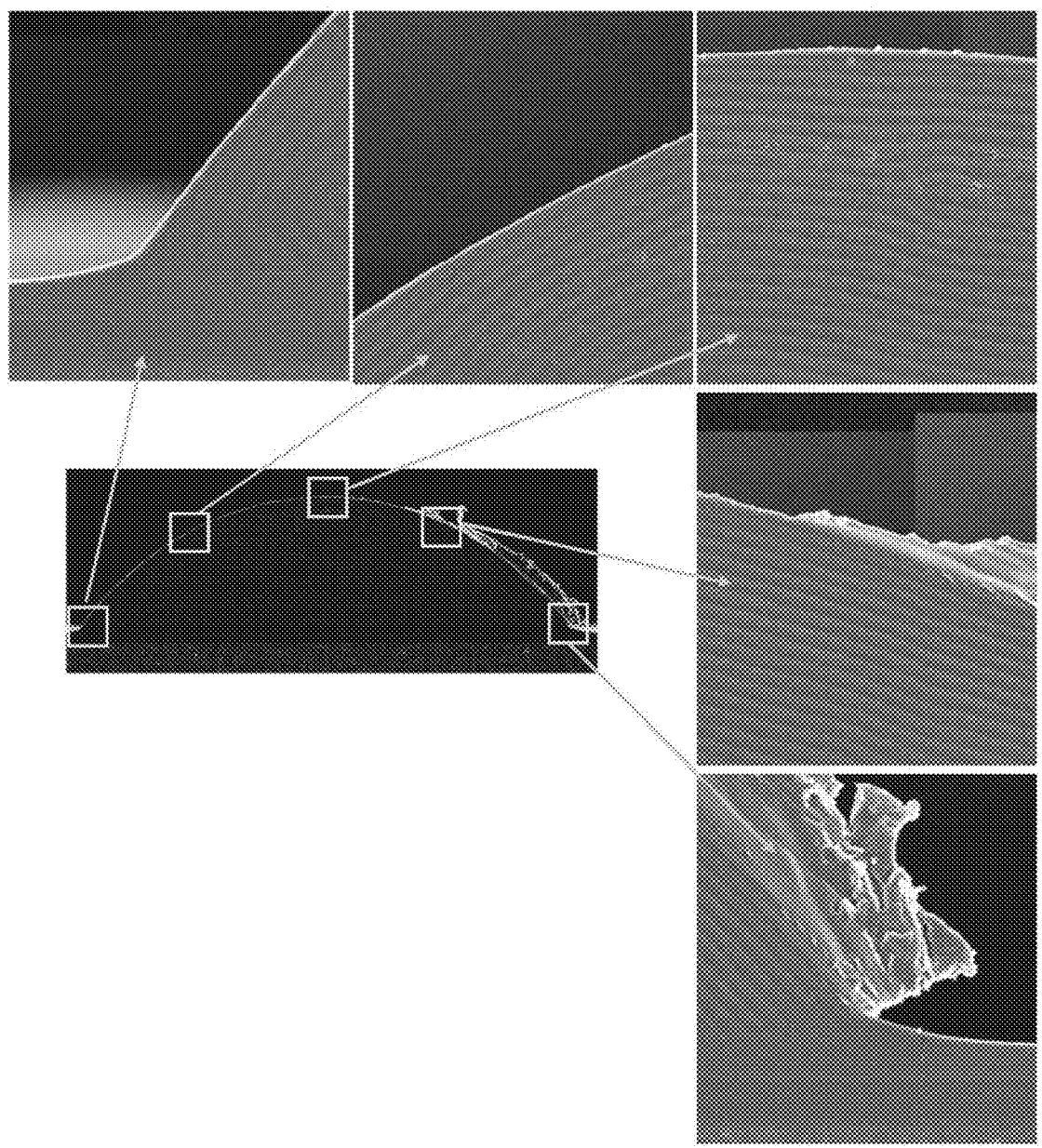
FIG. 7 shows a sectional image, taken by a scanning electron microscope, of cholesteric liquid crystal dots fabricated in Examples.

As shown in FIG. 7, a fringe pattern of bright and dark portions can be identified in the sectional SEM image obtained. At least the angle formed by the normal line to the line of the first dark portion from the surface on the air interface side of the dot in the region from the dot apex (0°)

to 50° with the surface of the dot air interface side falls within a range of 80° to 90°.

The reflective properties of the cholesteric liquid crystal dots were evaluated with a bifurcated optical fiber, an ultra-high resolution fiber multi-channel spectroscope (HR4000), and a visible-near infrared irradiating light source (HL-2000) made by Ocean Optics Co. This revealed the peak reflection wavelength to be 850 nm. Retroreflectivity was observed over a range from the dot apex (0°) to 50°.

(Forming the Over Coat Layer)

The following composition was stirred and dissolved in a vessel maintained at 25° C. to prepare an over coat coating liquid.

| Over coat coating liquid (weight parts) | |
| --- | --- |
| Acetone | 100.0 |
| Kayarad DPCA-30 (made by Nippon Kayaku Co., Ltd.) | 100.0 |
| Irgacure 819 (made by BASF Corp.) | 3.0 |

The over coat coating liquid prepared above was coated in a quantity of 40 mL/m² with a bar coater on the under layer surface on which the cholesteric liquid crystal dots had been formed. Subsequently, heating was conducted to a film surface temperature of 50° C., drying was conducted for 60 seconds, and 500 mJ/cm² of UV radiation was irradiated with a UV irradiation apparatus to promote a crosslinking reaction and prepare an over coat layer.

To protect the over coat layer, a glass sheet (Eagle XG made by Corning) was laminated over the over coat layer that had been prepared.

An input medium was obtained comprising a pattern of cholesteric liquid crystal dots on the surface of an under layer formed on a PET support, with an over coat layer and a glass sheet sequentially present over the dot pattern.

(Evaluating the Reading Error Generation Rate)

The following evaluation was conducted to evaluate the reading error generation rate when information was inputted to the input medium fabricated above with the input unit tilted.

A sample base and a turning stage were placed on an optical plate so that image pickup was possible at prescribed angles. An infrared LED element OSI3CA5111A (made by OptoSupply Co.), a CMOS camera module SW-720 (made by Sunmore Smart Technology Corp.), and a triple axis acceleration sensor module KXR94-2050 (made by Akizuki Electronic Commerce Co.) were assembled to construct an evaluation system on the turning stage. The light source in the form of the infrared LED elements was disposed with respect to the input medium so as to be essentially facing in the same direction as the CMOS camera module and be able to pick up retroreflected light. Here, the term "essentially facing in the same direction" means a misalignment angle of less than 5°.

By the above evaluation system, an image of the input medium was picked up from a perpendicular direction (0°) and a 40° direction relative to the surface (glass sheet surface) of the input medium tilted by 30° relative to the horizontal plane. The images that were picked up in this manner all contained at least 6×6=36 dots. Positional detection was conducted on the 6×6=36 individual dots based on the images that were picked up. Each of the dots was determined to have a shift in either the vertical or right-left direction relative to the virtual grid. This shift was adopted as the pattern information of the image. Whether the pattern information determined based on the 40° direction image is different from the pattern information determined based on the image in the perpendicular direction (0°) was adopted as the reading error generation rate. Examples 1 to 3 were cases in which correction processing based on the flowcharts of FIG. 6(A) to (C) set forth above was conducted and Comparative Example 1 was the case where no correction processing was conducted. Each of the above measurements was repeated 100 times and the average value of the reading error generation rate obtained was adopted. Evaluation was conducted on the following scale. The results are given in Table 1.

A: A reading error generation rate of greater than or equal to 0.0% and less than 1.0%
B: A reading error generation rate of greater than or equal to 1.0% and less than 3.0%
C: A reading error generation rate of greater than or equal to 3.0% and less than 8.0%
D: A reading error generation rate of greater than or equal to 8.0%

TABLE 1

| | Example 1 (correction processing based on flowchart of FIG. 6(A)) | Example 2 (correction processing based on flowchart of FIG. 6(B)) | Example 3 (correction processing based on flowchart of FIG. 6(C)) | Comparative Example 1 (no correction processing) |
| --- | --- | --- | --- | --- |
| Evaluation of reading error generation rate | C | B | A | D |

Based on the results given in Table 1, information processing based on correction processed position information obtained by the above correction processing was found to improve precision in specifying position coordinates (decrease the reading error generation rate).

The present invention is useful in various fields of information processing utilizing coding by dot patterns.

The present disclosure relates to the subject matter contained in Japanese Patent Application No. 2014-223349 filed on Oct. 31, 2014, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:
1. An information processor, comprising:
an input unit having an illuminating part and an image pickup part and
an input medium having an input surface on which inputting of information is carried out by the input unit;

wherein, on the input medium, position coordinates on the input surface are coded by a dot pattern present on the input medium, the dot pattern contains one or more dots exhibiting retroreflectivity for light entering from a direction oblique to the dot, the input unit irradiates light from the illuminating part onto the input medium on the input surface of the input medium, the irradiated light reflects off the dot contained in the dot pattern, the reflected light is picked up by the image pickup part, and position information of the dot pattern containing the dot that has reflected light is obtained, the input unit further has an input unit angular position measuring part that measures an angular position of the input unit while the light is irradiated, and wherein input information specified by the position coordinates of a position on the input surface on which the light is irradiated, is obtained based on correction processed position information obtained by correction processing based on the angular position measured by the input unit angular position measuring part.

2. The information processor according to claim 1, wherein the input unit is displaced on the input surface of the input medium while irradiating light onto the input medium from the illuminating part, and based on the correction processed position information, the input unit obtains input information in the form of a displacement path of displacement of the input unit on the input surface of the input medium.

3. The information processor according to claim 2, wherein the dot is a cholesteric liquid crystal dot.

4. The information processor according to claim 2, which further comprises an input medium angular position measuring part that measures an angular position of the input medium, wherein, based on the angular position of the input medium while irradiating light that is measured by the input medium angular position measuring part, the angular position of the input unit measured by the input unit angular position measuring part is corrected, and based on the corrected angular position, the correction processed position information is obtained.

5. The information processor according to claim 2,
wherein the input medium has one or more additional layers provided on the dot pattern,
the information processor conducts correction processing based on a refractive index and thickness of the additional layers to obtain correction processed position information.

6. The information processor according to claim 2, wherein the light that is irradiated by the illuminating part of the input unit is near infrared light.

7. The information processor according to claim 2, wherein the input unit is an input unit in the form of a pen.

8. The information processor according to claim 7, the input unit is a handwriting input pen.

9. The information processor according to claim 1, wherein the dot is a cholesteric liquid crystal dot.

10. The information processor according to claim 9, which further comprises an input medium angular position measuring part that measures an angular position of the input medium, wherein, based on the angular position of the input medium while irradiating light that is measured by the input medium angular position measuring part, the angular position of the input unit measured by the input unit angular position measuring part is corrected, and based on the corrected angular position, the correction processed position information is obtained.

11. The information processor according to claim 9,
wherein the input medium has one or more additional layers provided on the dot pattern,
the information processor conducts correction processing based on a refractive index and thickness of the additional layers to obtain correction processed position information.

12. The information processor according to claim 9, wherein the light that is irradiated by the illuminating part of the input unit is near infrared light.

13. The information processor according to claim 9, wherein the input unit is an input unit in the form of a pen.

14. The information processor according to claim 13, the input unit is a handwriting input pen.

15. The information processor according to claim 1, which further comprises an input medium angular position measuring part that measures an angular position of the input medium, wherein, based on the angular position of the input medium while irradiating light that is measured by the input medium angular position measuring part, the angular position of the input unit measured by the input unit angular position measuring part is corrected, and based on the corrected angular position, the correction processed position information is obtained.

16. The information processor according to claim 1,
wherein the input medium has one or more additional layers provided on the dot pattern,
the information processor conducts correction processing based on a refractive index and thickness of the additional layers to obtain correction processed position information.

17. The information processor according to claim 1, wherein the light that is irradiated by the illuminating part of the input unit is near infrared light.

18. The information processor according to claim 1, wherein the input unit is an input unit in the form of a pen.

19. The information processor according to claim 18, the input unit is a handwriting input pen.

20. The information processor according to claim 1, wherein the input unit further comprises an information transmitting part that transmits the input information that is obtained to an information displaying part that displays the information.

* * * * *